US011042969B2

(12) United States Patent
Amirghodsi et al.

(10) Patent No.: US 11,042,969 B2
(45) Date of Patent: Jun. 22, 2021

(54) AUTOMATIC SYNTHESIS OF A CONTENT-AWARE SAMPLING REGION FOR A CONTENT-AWARE FILL

(71) Applicant: ADOBE INC., San Jose, CA (US)

(72) Inventors: Sohrab Amirghodsi, Seattle, WA (US); Elya Shechtman, Seattle, WA (US); Derek Novo, San Jose, CA (US)

(73) Assignee: ADOBE INC., San Jose, CA (US)

( * ) Notice: Subject to any disclaimer, the term of this patent is extended or adjusted under 35 U.S.C. 154(b) by 58 days.

(21) Appl. No.: 16/420,782

(22) Filed: May 23, 2019

(65) Prior Publication Data
US 2020/0372619 A1    Nov. 26, 2020

(51) Int. Cl.
| | |
|---|---|
| *G06K 9/00* | (2006.01) |
| *G06T 5/00* | (2006.01) |
| *G06T 7/194* | (2017.01) |
| *G06T 7/90* | (2017.01) |
| *G06T 7/70* | (2017.01) |
| *G06T 5/20* | (2006.01) |

(52) U.S. Cl.
CPC .............. *G06T 5/005* (2013.01); *G06T 5/002* (2013.01); *G06T 7/194* (2017.01); *G06T 7/70* (2017.01); *G06T 7/90* (2017.01); *G06T 5/20* (2013.01)

(58) Field of Classification Search
CPC ..................................................... G06T 5/005
See application file for complete search history.

(56) References Cited

U.S. PATENT DOCUMENTS

| | | | |
|---|---|---|---|
| 9,922,404 B2 * | 3/2018 | Lee ........................... G06T 7/11 |
| 2002/0136453 A1 * | 9/2002 | Aggarwal ............. G06T 11/001 |
| | | | 382/166 |
| 2014/0126833 A1 * | 5/2014 | Huang .................... G06T 5/005 |
| | | | 382/254 |

(Continued)

FOREIGN PATENT DOCUMENTS

CA        3006240 A1 *  11/2016    ........... G06T 7/0004

OTHER PUBLICATIONS

Kopf, J., Kienzle, W., Drucker, S., & Kang, S. B. (2012). Quality prediction for image completion. ACM Transactions on Graphics (TOG), 31(6), 131.

(Continued)

*Primary Examiner* — Oneal R Mistry
(74) *Attorney, Agent, or Firm* — Shook, Hardy & Bacon L.L.P.

(57) ABSTRACT

Embodiments of the present invention provide systems, methods, and computer storage media for automatically synthesizing a content-aware sampling region for a hole-filling algorithm such as content-aware fill. Given a source image and a hole (or other target region to fill), a sampling region can be synthesized by identifying a band of pixels surrounding the hole, clustering these pixels based on one or more characteristics (e.g., color, x/y coordinates, depth, focus, etc.), passing each of the resulting clusters as foreground pixels to a segmentation algorithm, and unioning the resulting pixels to form the sampling region. The sampling region can be stored in a constraint mask and passed to a hole-filling algorithm such as content-aware fill to synthesize a fill for the hole (or other target region) from patches sampled from the synthesized sampling region.

20 Claims, 11 Drawing Sheets

(56) References Cited

U.S. PATENT DOCUMENTS

2016/0034704 A1\* 2/2016 Shim .................. H04N 5/23229
  726/26
2019/0108631 A1\* 4/2019 Riley .................... G06T 7/0004

OTHER PUBLICATIONS

Simakov, D., Caspi, Y., Shechtman, E., & Irani, M. (Jun. 2008). Summarizing visual data using bidirectional similarity. In 2008 IEEE Conference on Computer Vision and Pattern Recognition (pp. 1-8). IEEE.

Barnes, C., Shechtman, E., Finkelstein, A., & Goldman, D. B. (Jul. 2009). PatchMatch: A randomized correspondence algorithm for structural image editing. In ACM Transactions on Graphics (ToG) (vol. 28, No. 3, p. 24). ACM.

Sun, J., Yuan, L., Jia, J., & Shum, H. Y. (Jul. 2005). Image completion with structure propagation. In ACM Transactions on Graphics (ToG) (vol. 24, No. 3, pp. 861-868). ACM.

Perez, P., Gangnet, M., & Blake, A. (2004). Patchworks: Example-based region tiling for image editing. Microsoft Research, Redmond, WA, Tech. Rep. MSR-TR-2004-04, 1-8.

Bornard, R., Lecan, E, Laborelli, L., & Chenot, J. H. (Dec. 2002). Missing data correction in still images and image sequences. In Proceedings of the tenth ACM international conference on Multimedia (pp. 355-361) ACM.

Jia, J., & Tang, C. K. (Jun. 2003). Image repairing: Robust image synthesis by adaptive nd tensor voting. In 2003 IEEE Computer Society Conference on Computer Vision and Pattern Recognition, 2003. Proceedings. (vol. 1, pp. I-I) IEEE.

Stella, X. Y., & Shi, J. (2003, Oct.). Multiclass spectral clustering. In Proceedings of the Ninth IEEE International Conference on Computer Vision (ICCV 2003) (p. 313). IEEE.

Felzenszwalb, P. F., & Huttenlocher, D. P. (2004). Efficient graph-based image segmentation. International journal of computer vision, 59(2), 167-181.

\* cited by examiner

AUTOMATIC SYNTHESIS OF A CONTENT-AWARE SAMPLING REGION FOR A CONTENT-AWARE FILL

BACKGROUND

When editing images, a user may desire to remove an unwanted object from an image. For example, a photograph may include an unwanted subject, visual artifacts such as those resulting from damage or digital effects, and the like. However, simply deleting an unwanted region leaves a hole in the image. Some digital image processing tools can automatically fill the hole with translated patches sampled from other regions of the image. For example, some tools use a randomized algorithm to identify approximate nearest neighbor matches between image patches. As such, some tools can construct a composite fill from the translated image patches. In this manner, users can automatically fill in missing portions of an image. However, conventional in a substantial number of cases, conventional techniques fill the hole with the wrong image content, producing an awkward and unnatural result.

SUMMARY

Embodiments of the present invention are directed to techniques for automatically synthesizing a content-aware sampling region for a hole-filling algorithm such as content-aware fill, or for expanding a designated region of an image such as a user-identified region outlining an object in the image. Given a source image and a hole (or other target region to fill), a sampling region can be synthesized by identifying a band of pixels surrounding the hole, clustering these pixels based on one or more characteristics (e.g., color, x/y coordinates, depth, focus, etc.), passing each of the resulting clusters as foreground pixels to a segmentation algorithm, and unioning the resulting pixels to form the sampling region. The sampling region can be stored in a constraint mask and provided to a hole-filling algorithm such as content-aware fill to synthesize a fill for the hole (or other target region) from patches sampled from the synthesized sampling region.

As such, using implementations described herein, a user can efficiently and effectively synthesize content-aware fills.

BRIEF DESCRIPTION OF THE DRAWINGS

The present invention is described in detail below with reference to the attached drawing figures, wherein.

DETAILED DESCRIPTION

Overview

Figure 1:
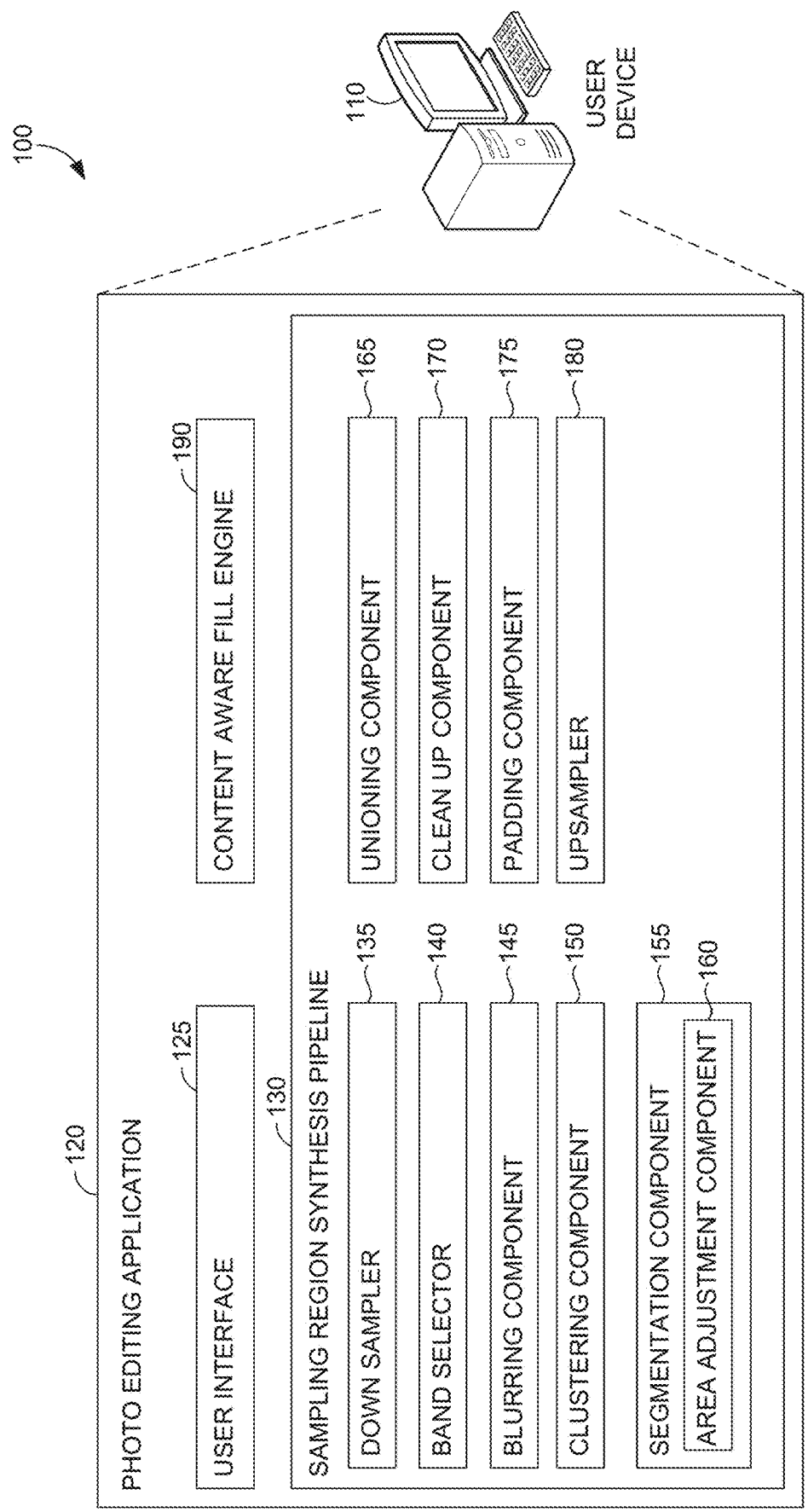
FIG. 1 is a block diagram of an example computing system for automatically synthesizing a content-aware sampling region for a content-aware fill, in accordance with embodiments of the present invention.

Often during photo editing, a user desires to remove an unwanted object from an image. One conventional tool to accomplish this is a content-aware fill ("CAF") tool. Generally, a CAF tool might allow the user to select, highlight, draw or otherwise indicate an unwanted region of the image. Conventional content-aware fill techniques remove the unwanted region and automatically fill the resulting hole using samples from other parts of the image. A CAF algorithm seeks to approximately reconstruct a target image (e.g., the hole) by rearranging and piecing together (with overlaps) small, square patches of pixels from a source image (e.g., a sampling region). CAF seeks to identify an approximate matching patch (i.e., the nearest neighbor) from the sampling region for each patch of a target image (i.e., the hole to fill). Candidate patches from the source image are selected, tested, and refined in an iterative manner. The resulting reconstruction can fill the hole in the way that makes it look like the unwanted object was never there.

However, conventional content-aware fill tools suffer from various drawbacks. For example, in a substantial number of cases, the hole is filled with the wrong image content, producing an awkward and unnatural result. For example, synthesized textures, lines, or colors in a fill may be inconsistent, disjointed, or blurred. Furthermore, some parts of a hole are often incorrectly filled with content that obviously does not belong, producing a non-plausible, undesirable fill. As such, there is a need for techniques that improve content-aware fills.

Accordingly, embodiments of the present invention are directed to techniques for automatically synthesizing a content-aware sampling region for a hole-filling algorithm such as content-aware fill. Given a source image and a hole (or other target region to fill, whether user-selected, automatically identified, or otherwise), a sampling region can be synthesized by identifying a band of pixels surrounding the hole, clustering these pixels based on one or more characteristics (e.g., color, x/y coordinates, depth, focus, etc.), providing each of the resulting clusters as foreground pixels to a segmentation algorithm, and unioning the resulting pixels to form the sampling region. This sampling region is content-aware in the sense that it is synthesized based on an analysis of content (e.g., pixels, pixel characteristics, etc.) of the source image. The sampling region can be stored in a constraint mask and passed to a hole-filling algorithm such as content-aware fill to synthesize a fill for the hole (or other target region) from patches sampled from the synthesized sampling region.

In some embodiments, a band surrounding a hole (or other target region) may be identified as an initial context region to facilitate synthesizing the sampling region. Generally, the pixels surrounding a hole are likely to have characteristics that can be used to fill the hole. These regions tend to contain content that is chromatically similar to the context of the hole. By limiting the sampling region to content that is chromatically similar to the content in the hole (i.e., the context of the hole), a patch synthesis algorithm has a better chance of sampling regions that are semantically similar to imaged objects overlapping with the hole. In some embodiments, the band may be identified as a width of pixels surrounding the hole. The width of the band may be predetermined, user-selected, or otherwise. In some embodiments, one or more morphological operations may be applied (e.g., to the hole) to generate the band. The resulting band of pixels surrounding the hole may be used as an initial context for the hole (e.g., a band of initial context pixels).

In some embodiments, clustering can be applied to the band of initial context pixels. In many cases, a hole will overlap with image regions that contain multiple chromatic characteristics. For example, a selected hole from an outdoor scene may include some context pixels in the band that contain sky and other context pixels that contain earth tones. In such cases, applying a foreground segmentation algorithm on the band may tend to favor colors with majority representation along the context band over colors with less representation. For example, the foreground segmentation algorithm may tend to return areas only or mostly representing majority colors along the band. To compensate for this potential underrepresentation, prior to applying foreground segmentation, clustering can be applied to the band of initial context pixels to group like pixels in the initial context. Any type of clustering may be applied, such as k-means clustering, mean-shift clustering, spectral clustering, agglomerative clustering, and/or others. In some embodiments, clustering may be performed based on any number and any combination of image characteristics and/or related information (e.g., color, x/y coordinates, depth, focus, frequency, semantic masks, etc.). For example, clustering may be performed in multiple dimensions (e.g., five-dimensional clustering in RBG space and image space). A designated number of clusters may be identified (e.g., pre-determined, user-selected, etc.), clusters may be merged to arrive at the designated number, and clusters that do not border the hole may be pruned. In some embodiments, blurring may be applied to the source image and/or the initial context prior to clustering the band of context pixels to facilitate the clustering algorithm outputting regions that are more likely to be contiguous. Any type of blurring may be applied, such as Gaussian blurring, bilateral blurring, averaging filtering, or otherwise.

To identify regions of a source image that are chromatically similar to the context pixels in the band, for each cluster of context pixels from the band, foreground segmentation may be applied to identify foreground and background pixels of the source image, using the context pixels as a seed of example foreground pixels. Thus, pixels bordering a hole may be passed to a foreground segmentation algorithm as a seed of foreground pixels, and the foreground segmentation algorithm may output a foreground image mask indicating which pixels of the source image belong to the foreground and which pixels belong to the background. The resulting foreground pixels can be used to represent a region of the source image that is similar to the pixels within the band of context pixels. The foreground segmentation algorithm may run separately for each cluster of pixels in the band of context pixels, treating the pixels in a given cluster as foreground pixels for a given iteration. Effectively, foreground segmentation serves to extend clusters of context pixels outward to capture other similar pixels in the source image. Expanding the relevant context can assist hole-filling algorithms by increasing the number of potential valid patches and reducing the risk of synthesizing a fill with obvious repetitions.

Generally, using clusters of context pixels as seeds for a foreground segmentation represents an improvement over prior techniques. As a preliminary matter, designers of hole-filling techniques often choose between global operations (e.g., operations occurring over an entire context region) and local operations (e.g., breaking down the context region into disparate regions that are separately processed). In this scenario, running a foreground segmentation algorithm globally (e.g., over an entire context region) may be considered a blunt technique that can limit accuracy, while running a foreground segmentation algorithm locally (e.g., over disparate context regions) may be considered prohibitively expensive. However, clustering the context pixels by some global characteristic into a limited number of clusters enables the operation of a relatively expensive foreground segmentation algorithm on each of the clusters, synthesizing the benefits of global and local techniques.

In some embodiments, the foreground segmentation algorithm may output clusters of context regions that are disproportionate to one another. A hole-filling algorithm that uses a sampling region with disproportionate clusters may favor larger clusters over smaller clusters by including a disproportionate representation from larger clusters. This disproportionate representation may affect a hole-filling process that uses uniform sampling by magnifying the disparity in representation. Underrepresented clusters may then have a higher chance of matching with regions retrieved from well-represented and/or overrepresented clusters, which may lead to non-plausible solutions.

As such, in some embodiments, the areas of the image containing the clusters of context pixels may be adjusted for proportionality. For example, a designated characteristic of a cluster of context pixels may be identified (e.g., an expansion ratio comparing the extended area of foreground pixels output from the segmentation algorithm to the initial area of foreground pixels input into the segmentation algorithm, a ratio comparing circumferences, some other aspect of the initial and extended areas, etc.). The identified characteristic for the cluster may be used as a target characteristic for rerunning the foreground segmentation algorithm for the other clusters of context pixels. In some embodiments, the largest (or smallest, median, average, etc.) expansion ratio may be used as a target ratio. To resize an expanded cluster of context pixels, the corresponding initial area of context pixels may be rerun through the segmentation algorithm using an adjustment that reduces a similarity criteria, thereby identifying more neighboring pixels (or vice versa). For example, the similarity criteria may include a smoothness term that impacts weights for identifying neighboring pixels (e.g., the neighborhood term in GraphCut). A foreground segmentation algorithm may be rerun one or more times, updating the similarity criteria with each iteration. The process may continue for a designated number of iterations, upon achieving the target characteristic within a tolerance or threshold of similarity, or otherwise. As such, the clusters of context pixels may have areas that are substantially proportional to one another.

Generally, there is a tradeoff between the size of the original band of context pixels and the need to increase the size of clusters of extended context regions generated by the foreground segmentation algorithm. In embodiments that use a relatively smaller band, some initial clusters may not have enough data to provide the foreground segmentation algorithm with enough context to identify a meaningful cluster of similar context pixels in the source region. On the other hand, the larger the band, the more likely the foreground segmentation algorithm is to identify all or most of the similar context pixels in the source region. The size of the band may further be constrained because a band size that is too large may tie up the foreground segmentation algorithm, the clustering algorithm, and/or otherwise result in latency. As such, some embodiments may implement a design that balances band size with one or more of the following: enlarging the size of clusters of context regions generated by the foreground segmentation algorithm, a number of iterations of the foreground segmentation algorithm, a corresponding tolerance or threshold of similarity, or otherwise.

The resulting clusters of context pixels may be unioned together to form a sampling region. For example, the unioned region may be used to form a single channel binary mask that can be used to denote which pixels are valid to use in a hole-filling algorithm. In some embodiments, the sampling region may be processed to remove small holes and specks that can negatively affect a hole-filling algorithm. For example, in some hole-filling algorithms, any patch that touches a hole is invalid, so a sampling region that contains many small holes (e.g., similar to Swiss cheese) can reduce the number of potentially valid patches that can be generated from the sampling region. Further, specks appearing outside of a sampling region may result in wasted computations during hole filling. As such, the sampling region may be processed in any number of ways, such as by performing one or more morphological operations, median filtering, some other procedure that fills in small holes and/or removes specks, some combination thereof, or otherwise. In some embodiments, a closing operation may be performed to close small holes in the sampling region, and an opening operation may be performed to remove specks. The closing operation may be performed first because small holes are often more harmful in hole-filling. These and other variations may be implemented within the scope of the present disclosure.

In some embodiments, the resulting sampling region may be padded with a band of pixels around the hole (or other target region). For example, it may be possible that the synthesized sampling region does not include all pixels that border the hole. Furthermore, in some embodiments, clusters that do not touch the hole, but that nevertheless contain pixels that are close to the hole, may be pruned. In many cases, however, the most important pixels to sample are the ones that are closest to the hole. Thus, a padding band of pixels surrounding the hole may be added to the sampling region. The padding band may be identified as a width of pixels surrounding the hole. The width of the padding band may be predetermined, user-selected, or otherwise.

The resulting sampling region (e.g., binary mask) may be stored in, or otherwise associated with, a constraint mask, and may be passed to a hole-filling algorithm such as content-aware fill to synthesize a fill for the hole (or other target region) from patches sampled from the synthesized sampling region. As such, using implementations described herein, content-aware fills can be efficiently and effectively synthesized from a content-aware sampling region. Although embodiments are described with respect to a hole-filling algorithm, techniques described herein may be implemented in any algorithm that samples some region of an image to fill another region (e.g., spot healing), or otherwise.

Further, techniques described herein may be implemented to expand a designated region of image. For example, an identification of an object from an image (e.g., a user-selected region outlining an object, an automatically detected region using object detection, etc.) may designate boundaries that cut off portions of the object. As such, techniques described herein may be applied to expand a designated region of an image, such as a region of an object in the image, in order to capture similar content that may have been inadvertently omitted. This latter application can be used to improve the accuracy of objection selection and object identification.

Having briefly described an overview of aspects of the present invention, various terms used throughout this description are provided. Although more details regarding various terms are provided throughout this description, general descriptions of some terms are included below to provider a clearer understanding of the ideas disclosed herein:

Patch synthesis—Some digital image processing tools can automatically synthesize a target image from patches sampled from other regions of the image. Generally, patch synthesis refers to this reconstruction of a target image from patches sampled from a source image. In the context of hole filling, the target image to be synthesized can be a hole in an image, and the source image—or sampling region—can be the rest of the image, or some portion thereof. One particular patch synthesis technique uses a randomized algorithm to identify approximate nearest neighbor matches between image patches and constructs a composite fill from the identified image patches. Such techniques for identifying approximate nearest neighbor matches are also known as patch matching, and the resulting composite fill is also known as a content-aware fill.

Hole—Sometimes, a photograph or other image includes some unwanted object, such as an unwanted subject, visual artifacts such as those resulting from damage or digital effects, and the like. However, simply deleting an unwanted region would leave a hole in the image. As used herein, "hole" can refer to the region of the image to be filled, regardless of whether the region has actually been deleted. Similarly, "hole" can refer to a corresponding invalid sampling region in a mask such as a constraint mask.

Mask—As used herein, a mask is one or more data structures that identify and/or designate certain pixels for a particular use. For example, a mask can be initialized with the same dimensions as an original image to be edited. The mask can identify pixels in a hole to be filled, pixels in a valid sampling region, pixels in a reduced region, pixels in a fringe, and the like. In one example, a user selection can be used to generate a constraint mask designating a valid sampling region in an image. In one implementation, the constraint mask can encode a state for each pixel, such as pixels in a valid sampling region (e.g., using an arbitrary number such as 1, the value of the pixel, etc.), pixels in an invalid sampling region (e.g., 0), pixels in a hole, pixels in a user-specified constraint, etc. Other variations will be understood by those of ordinary skill in the art.

Extend—As used herein, extend means causing to cover a larger area. For example, an initial context region may be extended to cover a larger area by using the initial context region as a seed for a foreground segmentation algorithm. In this example, the initial context region may be extended to cover a larger area, whether or not the larger area is adjacent to or otherwise contiguous with the initial context region.

Similarity transform—Generally, a similarity transform is a shape-preserving transform that can include one or more translation, rotation, scaling and/or reflection (i.e., mirroring).

Example Sampling Region Synthesis Environment

Referring now to FIG. 1, a block diagram of example environment 100 suitable for use in implementing embodiments of the invention is shown. Generally, environment 100 is suitable for image editing, and, among other things, facilitates automatically synthesizing a content-aware sampling region for a content-aware fill. Environment 100 includes user device 110 having photo editing application 120 with user interface 125, sampling region synthesis pipeline 130, and content-aware fill engine 190. User device 110 can be any kind of computing device capable of facilitating image editing. For example, in an embodiment, user device 110 can be a computing device such as computing device 1100, as described below with reference to FIG. 11. In embodiments, user device 110 can be a personal computer (PC), a laptop computer, a workstation, a mobile computing device, a PDA, a cell phone, or the like. In the embodiment illustrated in FIG. 1, user interface 125, sampling region synthesis pipeline 130, and content-aware fill engine 190 are in communication with one another.

In the embodiment illustrated by FIG. 1, user device 110 includes user interface 125, sampling region synthesis pipeline 130, and content-aware fill engine 190. Any or all of these components may be incorporated, or integrated, into an application or an add-on or plug-in to an application, such as photo editing application 120. Photo editing application 120 may generally be any application capable of facilitating photo or image editing. Application 120 may be a stand-alone application, a mobile application, a web application, or the like. In some implementations, the application(s) comprises a web application, which can run in a web browser, and could be hosted at least partially server-side. In addition, or instead, the application(s) can comprise a dedicated application. In some cases, the application can be integrated into the operating system (e.g., as a service). One example application that may be used for photo editing is ADOBE® PHOTOSHOP®, which is a graphics editing application. Although user interface 125, sampling region synthesis pipeline 130, and content-aware fill engine 190 are generally discussed herein as residing on user device 110, in some cases, any or all of these components, or some portion thereof, can be additionally or alternatively integrated into the operating system (e.g., as a service) or a server (e.g., a remote server). These and other components may communicate with each other via a network, which may include, without limitation, one or more local area networks (LANs) and/or wide area networks (WANs). Such networking environments are commonplace in offices, enterprise-wide computer networks, intranets, and the Internet.

Generally, a source image and a target region of the image to fill (e.g., a hole) may be identified, provided, or otherwise accessed. For example, user interface 125 may allow a user to specify the source image and/or the target region. User interface 125 may be implemented using any suitable interaction elements. In some embodiments, user interface 125 may correspond with user interface 930 of FIG. 9 and/or content-aware fill workspace 1000 of FIG. 10. In another example, the source image may be automatically analyzed to detect distractors, anomalies, damage, or other flaws in the image, and the detected regions may be marked as holes. Sampling region synthesis pipeline 130 may automatically synthesize a content-aware sampling region based on the source image and the target region of the source image. Content-aware fill engine 190 may automatically synthesize a content-aware fill for the target region by sampling from the content-aware sampling region. Content-aware fill engine 190 may be implemented using any suitable hole-filling algorithm. In some embodiments, content-aware fill engine 190 may correspond with content-aware fill engine 960 of FIG. 9.

Although embodiments are described as synthesizing a sampling region from which patches can be sampled for a hole-filling algorithm, in some embodiments, synthesis pipeline 130 (or some portion thereof) may be used to identify an expanded region for some arbitrary region of image. For example, an identified region of an image (e.g., a user-selected region such as a region of an object in the image, an automatically detected region such as a region identified using object detection, etc.) may have one or more boundaries that cut off similar, surrounding content (e.g., portions of an identified object). As such, synthesis pipeline 130 may be applied to expand a designated region of an image, such as an identified region of an object in the image, in order to capture similar content from outside the identified region (e.g., content that may have been inadvertently omitted from the designated region). Thus, although some embodiments focus on generation of a sampling region for filling a target region, some embodiments may generate an expansion region that may be grouped with a designated region, thereby expanding the designated region to include similar content that was omitted. This technique can be used to improve the accuracy of objection selection and object identification by expanding a region of an object to include areas of the object that were cut off. These and other variations are contemplated within the present disclosure.

At a high level, given a source image and target region of the source image to fill (e.g., a hole), sampling region synthesis pipeline 130 may automatically synthesize a sampling region by identifying a band of pixels surrounding the target region, clustering these pixels based on some characteristics (e.g., color, x/y coordinates, depth, focus, etc.), passing each of the resulting clusters as foreground pixels to a segmentation algorithm, and unioning the resulting pixels to form the sampling region. In the embodiment illustrated in FIG. 1, sampling region synthesis pipeline 130 includes downsampler 135, band selector 140, blurring component 145, clustering component 150, segmentation component 155, unioning component 165, clean up component 170, padding component 175, and upsampler 180. This configuration is meant as an example, and other configurations with similar or different functionality may be implemented within the scope of the present disclosure.

In FIG. 1, sampling region synthesis pipeline 130 includes downsampler 135 and upsampler 180. Many segmentation algorithms are computationally expensive and/or can result in latency when processing relatively large images. As such, in some embodiments, downsampler 135 may downsample a source image and a target region (e.g. a mask identifying the target region) to improve performance of a segmentation algorithm (which may be implemented by segmentation component 155). By way of nonlimiting example, downsampler 135 may downsample down to a designated number of pixels in a particular dimension (e.g., 400 pixels). Sampling region synthesis pipeline 130 may synthesize a sampling region at the downsampled resolution, and upsampler

180 may apply upsampling to match the resolution of the original source image. Matching the resolution of the synthesized sampling region with the source image can facilitate viewing and/or modifying the sampling region, as discussed in more detail below with respect to FIGS. 9 and 10.

Band selector 140 may access a source image and a target region of the source region (e.g., a downsampled source image and target region) and identify a band of pixels surrounding the target region as an initial context region to facilitate synthesizing a sampling region. In some embodiments, the band may be identified as a width of pixels surrounding the hole. The width of the band may be predetermined, user-selected, or otherwise. Additionally or alternatively, one or more morphological operations may be applied (e.g., to the hole) to arrive at the band. The resulting band of pixels surrounding the hole may be used as an initial context for the hole.

In some embodiments, blurring component 145 may apply blur to a source image (e.g., a downsampled source image) and/or the initial context to facilitate clustering by clustering component 150. Take, for example, an image of a surface that has many fine ridges. Although to the human eye, the surface may appear to be a single color, zooming in on the image may reveal significant variation in brightness and/or pixel color. Clustering small regions of an image of this surface can produce high frequency effects, such as stripes. As such, blurring component 145 may apply blur to the source image and/or the initial context to facilitate the generation of clusters that are more likely to be contiguous. Any type of blurring may be applied, such as Gaussian blurring, bilateral blurring, averaging filtering, or otherwise.

Clustering component 150 may apply clustering to the band of initial context pixels to generate different clusters of like pixels in the initial context. Any type of clustering may be applied, such as k-means clustering, mean-shift clustering, spectral clustering, agglomerative clustering, and/or others. In some embodiments, clustering component 150 may cluster based on any number and any combination of image characteristics and/or related information (e.g., color, x/y coordinates, depth, focus, frequency, semantic masks, etc.). For example, clustering may be performed in multiple dimensions (e.g., five-dimensional clustering in RBG space and image coordinates). Generally, including image coordinates (e.g., x/y) in the clustering dimensions encourages cluster continuity. In some embodiments, one or more tunable parameters may be specified (e.g., pre-determined, user-selected, etc.), such as a designated number of clusters, cluster tightness, bandwidth, etc. Applying a threshold cluster size or maximum number of clusters may improve speed and performance. For example, if clusters are too small, subsequent segmentation may not produce useful results. Further, a limit on the amount of clusters may reduce the number of segmentation operations performed by segmentation component 155. As such, in embodiments in which the number of output clusters exceeds a designated number of clusters, clusters that are close together (e.g., pairs of neighboring clusters with centroids separated by the shortest Euclidean distance) may be merged to arrive at the designated number of clusters. Clusters that do not border the target may be pruned so only the clusters touching the target region survive. The result may be clusters of context pixels of substantially the same color.

Figure 2:
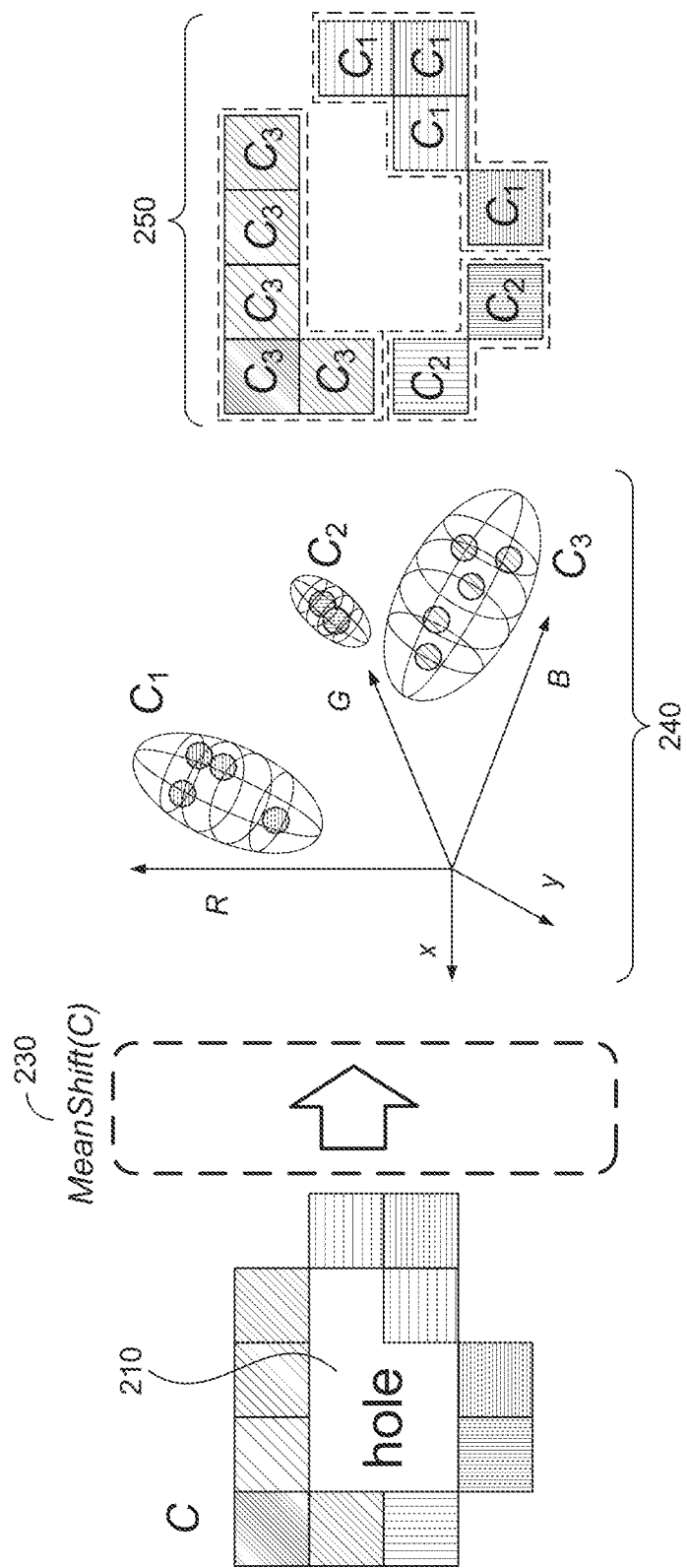
FIG. 2 illustrates an example of clustering pixels of a band of initial context pixels surrounding a hole, in accordance with embodiments of the present invention.
Figure 3:
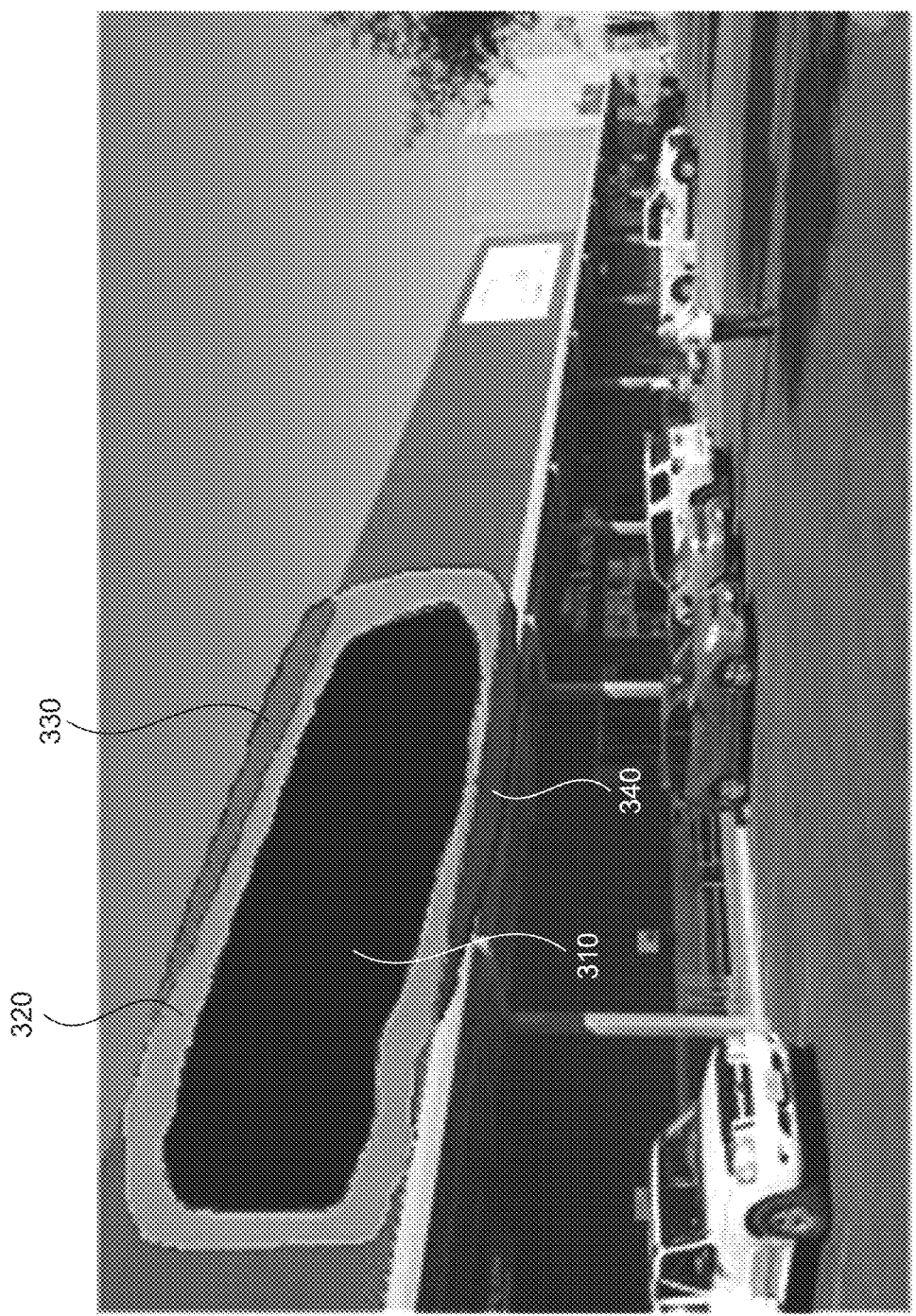
FIG. 3 illustrates an example of clustered pixels of a band surrounding a hole, in accordance with embodiments of the present invention.

FIG. 2 illustrates an example of clustering pixels of a band of initial context pixels surrounding a hole, in accordance with embodiments of the present invention. In FIG. 2, a band of initial context pixels C surround the hole 210. Here, C represents the union of all clusters in the band of initial context pixels. In the embodiment illustrated in FIG. 2, mean-shift clustering 230 is applied in five-dimensional space (three dimensions of RBG space and two dimensions of image coordinate) to C to separate out clusters $C_1$, $C_2$, and $C_3$. These clusters are illustrated in FIG. 2 in five-dimension space 240, as well as in image space 250. As illustrated, each of the clusters $C_1$, $C_2$, and $C_3$ has pixels with substantially the same color. FIG. 3 illustrates another example of clustered pixels of a band surrounding a hole, in accordance with embodiments of the present invention. In FIG. 3, the band of initial context pixels surrounding hole 310 has been separated into three clusters 320, 330, and 340. In embodiments that prune clusters that do not border the hole 310, clusters 330 and 340 may be pruned from the band of context pixels. Pruning such clusters from the context may facilitate a more accurate fill by omitting from the sampling region clusters of pixels that are likely to be chromatically different from boundary of the target region.

Returning now to FIG. 1, to identify regions of the source image that are chromatically similar to the clusters of context pixels in the band, segmentation component 155 may apply foreground segmentation based on each cluster of context pixels. More specifically, segmentation component 155 may access the (downsampled) source image (which may exclude the target region) and, for each cluster of context pixels, use the context pixels as example foreground pixels to segment foreground pixels and background pixels of the source image. Any known foreground segmentation algorithm may be used. In some embodiments, context pixels bordering a target region may be passed to segmentation component 155 as a seed of foreground pixels, and segmentation component 155 may output a foreground image mask indicating which pixels of the source image belong to the foreground and which pixels belong to the background. Segmentation component 155 may run separately for each cluster of pixels in the band of context pixels, treating the pixels in a given cluster as foreground pixels for a given iteration. As such, some or all the clusters of initial context pixels may be extended to other regions of the source image that may be similar.

In the embodiment illustrated in FIG. 1, segmentation component 155 includes area adjustment component 160. Area adjustment component 160 may adjust the areas of the clusters of context pixels for proportionality. For example, area adjustment component 160 may identify a designated characteristic of a cluster of context pixels (e.g., an expansion ratio comparing the extended area of foreground pixels output from the segmentation algorithm to the initial area of foreground pixels input into the segmentation algorithm, a ratio comparing circumferences, some other portion of the initial and extended areas, etc.). Area adjustment component 160 may use the identified characteristic for the cluster as a target characteristic for rerunning the foreground segmentation algorithm for the other clusters of context pixels in order to return less or more area for fair representation across all clusters. In some embodiments, the largest (or smallest, median, average, etc.) expansion ratio may be used as a target ratio.

Figure 4:
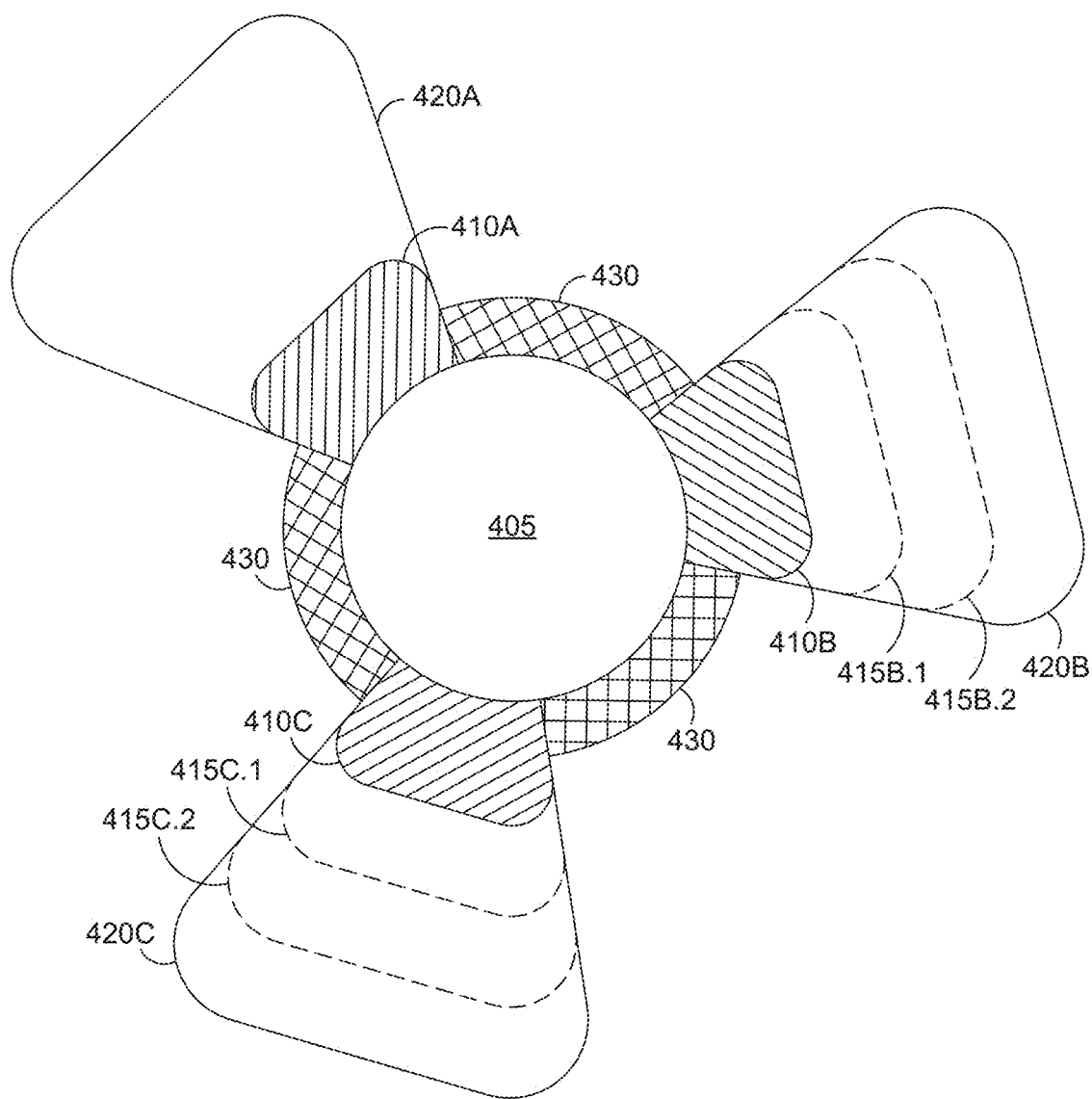
FIG. 4 is an example of area-adjusted foreground regions and padding, in accordance with embodiments of the present invention.

FIG. 4 is an example of area-adjusted foreground regions, in accordance with embodiments of the present invention. FIG. 4 illustrates an example hole 405 and initial context regions 410a, 410b, and 410c. Applying foreground segmentation based on these initial context regions may produce extended context regions of differing sizes. For example, running foreground segmentation based on initial context regions 410a, 410b, and 410c using a same similarity criteria (explained in more detail below) may generate extended context regions 420a, 415b1, and 415c1. As will be appreciated, these extended context regions have different sizes. To adjust the areas of these regions, a target expansion ratio may be determined. For example, the ratio of the areas of extended context region 420a to initial context region 410a may be identified as the target expansion ratio because it has the largest expansion ratio of the three segmentations (one corresponding to each initial context region 410a, 410b, 410c). As such, the other two segmentations (corresponding to initial context regions 410b and 410c) can be rerun to target this expansion ratio.

To resize an expanded cluster of context pixels, the corresponding initial area of context pixels may be rerun through the segmentation algorithm using an adjustment that reduces a similarity criteria, thereby identifying more neighboring pixels (or vice versa). For example, the similarity criteria may include a smoothness term that impacts weights for identifying neighboring pixels (e.g., the neighborhood term in GraphCut). As such, area adjustment component 160 of FIG. 1 may rerun the foreground segmentation algorithm one or more times, updating the similarity criteria with each iteration. The process may continue for a designated number of iterations, upon achieving the target characteristic within a tolerance or threshold of similarity, or otherwise. As such, the clusters of context pixels may have areas that are substantially proportional to one another. In the example illustrated in FIG. 4, successive iterations based on initial context area 410b may generate extended context regions 415b1, 415b2, and 420b. Successive iterations based on initial context area 410c may generate extended context regions 415c1, 415c2, and 420c. As such, in this example, the final context areas corresponding to initial context regions 410a, 410b, and 410c are extended context regions 420a, 420b, and 420c.

Returning now to FIG. 1, unioning component 165 may union the resulting context areas to form a single sampling region. For example, unioning component 165 may form a single channel binary mask that denotes valid and invalid pixels for sampling. In some embodiments, clean up component 170 may process the sampling region to remove small holes and/or specks. Clean up component 170 may process the sampling region in any number of ways, such as by performing one or more morphological operations, median filtering, some other procedure that fills in small holes (e.g., of a designated size) and/or removes specks (e.g., of a designated size), some combination thereof, or otherwise. In some embodiments, clean up component 170 may apply a closing operation to close small holes in the sampling region, and an opening operation to remove specks. These and other variations may be implemented within the scope of the present disclosure.

In some embodiments, padding component 175 may pad the sampling region with a band of pixels surrounding a target region to include pixels that are adjacent to the target region that may have been removed (e.g., during foreground segmentation). Padding component 175 may identify a padding band as a width of pixels surrounding the target region. The width of the padding band may be predetermined, user-selected, or otherwise. FIG. 4 illustrates an example padding, in accordance with embodiments of the present invention. In FIG. 4, the extended context regions 420a, 420b, and 420c may be unioned together to form the sampling region. However, this sampling region does not include all pixels that border the hole 405. As such, a padding band 430 may be added to the sampling region. This can ensure there are at least some valid patches bordering the hole 205.

Returning now to FIG. 1, sampling region synthesis pipeline 130 may store the synthesized sampling region (e.g., binary mask) in, or otherwise associated with, a constraint mask, and the sampling region and/or a corresponding mask may be passed to content aware fill engine 190 to synthesize a fill for the target region from patches sampled from the synthesized sampling region.

Figure 5:
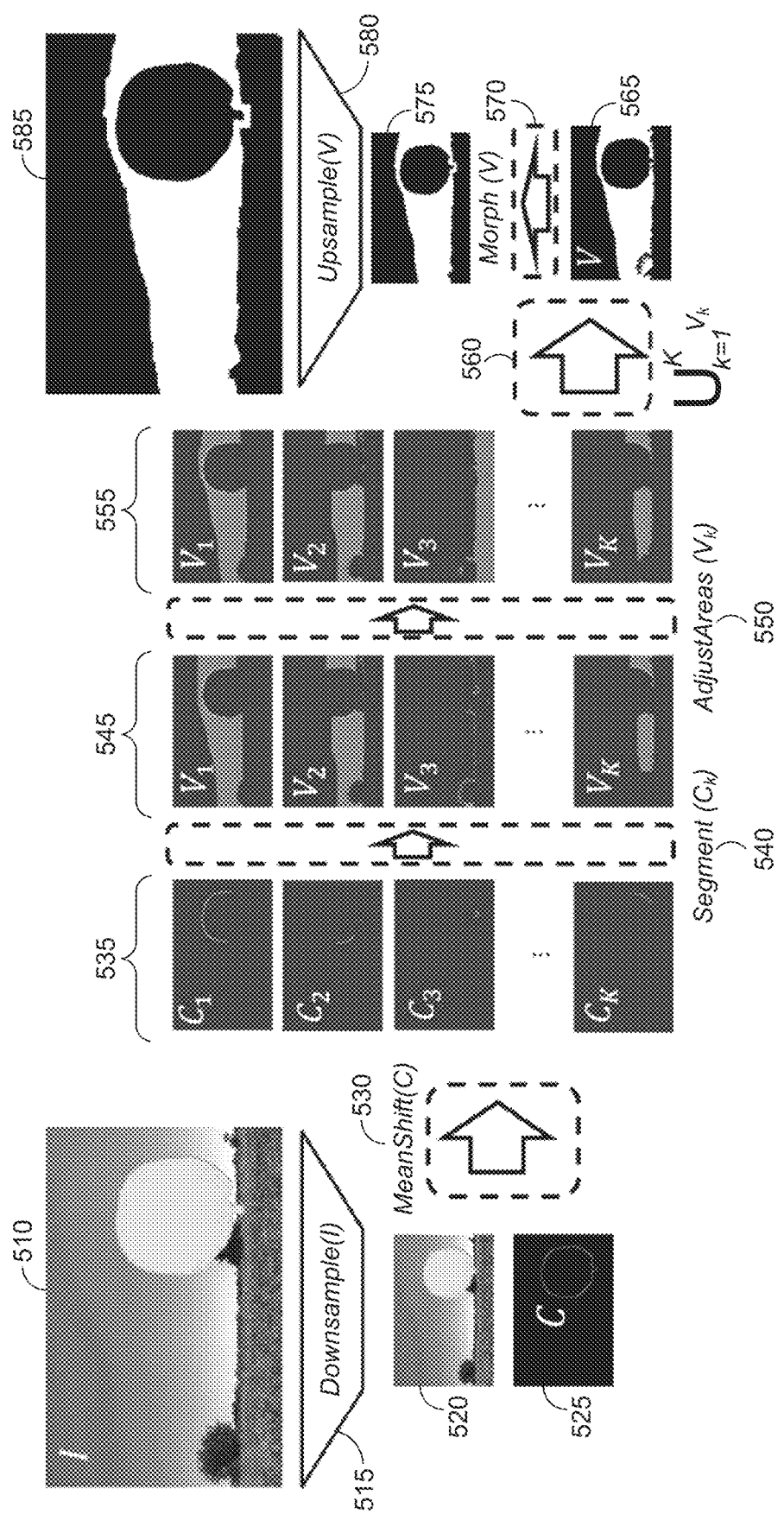
FIG. 5 is an example sampling region synthesis pipeline, in accordance with embodiments of the present invention.

Turning now to FIG. 5, FIG. 5 illustrates an example sampling region synthesis pipeline 500, in accordance with embodiments of the present invention. Sampling region synthesis pipeline 500 may correspond with an embodiment of sampling region synthesis pipeline 130 of FIG. 5. In FIG. 5, image 510 (which includes a hole) is downsampled 515 to generate thumbnail 520. A band of initial context pixels 525 is generated from thumbnail 520. In FIG. 5, C represents the union of all clusters in the band of initial context pixels 525. Mean-shift clustering 530 is applied to the band of initial context pixels 525 to generate clusters of initial context pixels 535. Each of the clusters of initial context pixels 535 is run through a foreground segmentation algorithm 540 to generate extended context regions 545. The extended context regions 545 are adjusted 550 to generate adjusted extended context regions 555. The adjusted extended context regions 555 are unioned 560 to generate sampling region 565, which may be stored in a binary mask that indicates valid pixels for sampling (illustrated in white in FIG. 5). Sampling region 565 is morphologically smoothed 570 by performing morphological operations to generate a more contiguous sampling region 575. Smoothed sampling region 575 is upsampled 580 to output a final synthesized sampling region 585 that matches the resolution of image 510. Sampling region synthesis pipeline 500 is meant simply as an example, and other variations may be implemented with similar or different functionality within the scope of the present disclosure.

Figure 6:
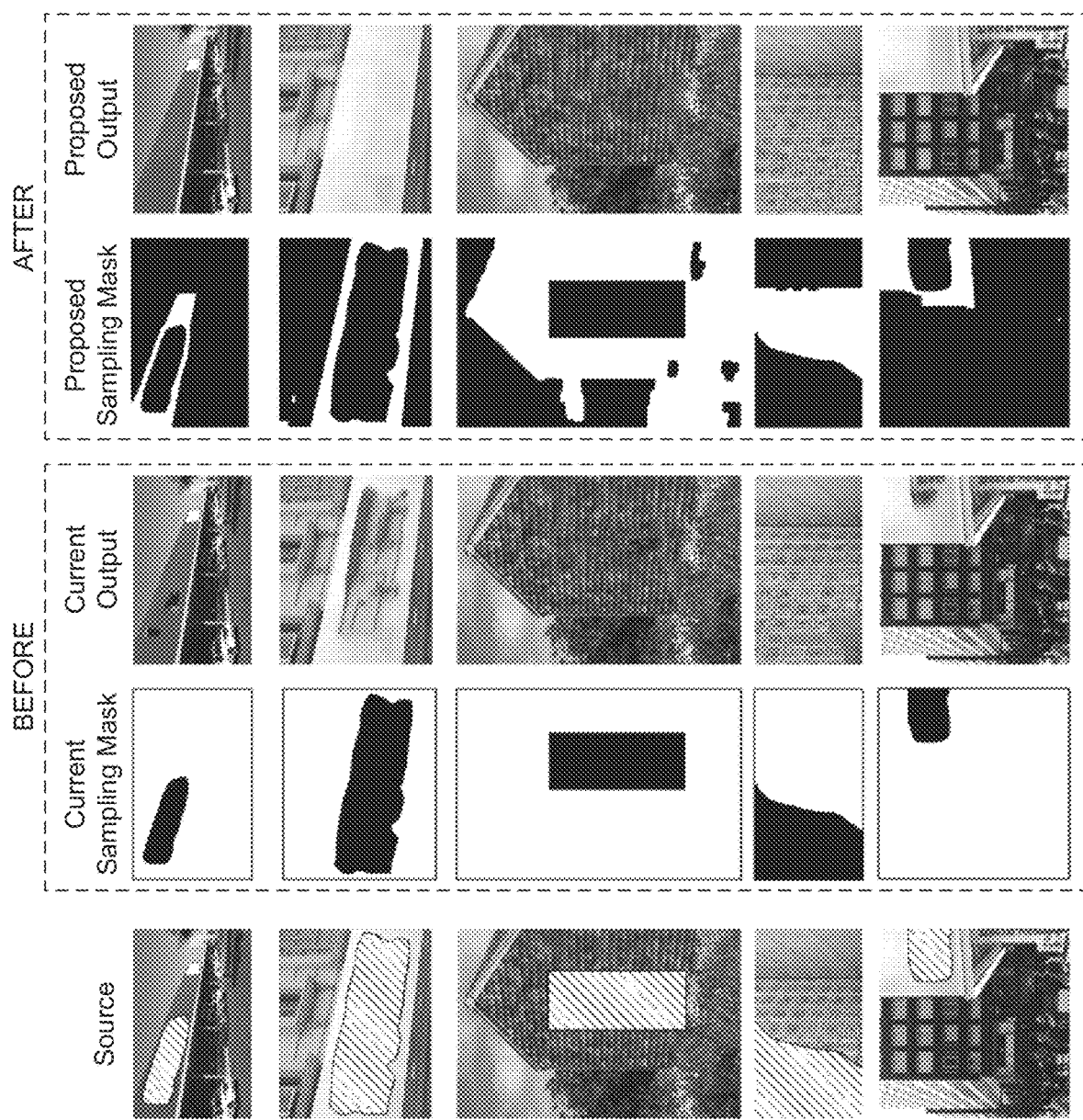
FIG. 6 illustrates example source images and a comparison of content-aware fills resulting from conventional sampling regions and synthesized content-aware sampling regions, in accordance with embodiments of the present invention.

FIG. 6 illustrates example source images and a comparison of content-aware fills resulting from conventional sampling regions and synthesized content-aware sampling regions, in accordance with embodiments of the present invention. In FIG. 1, the source images are illustrated with a corresponding hole to be filled (illustrated with a striped pattern). In conventional hole-filling algorithms, the hole may be removed from the source image, and the remaining area may be used as the sampling region. As illustrated in FIG. 6, the resulting conventional synthesized fills have various imperfections and errors. By contrast, using techniques described herein to synthesize content-aware sampling regions, the resulting synthesized fills in FIG. 6 are much more accurate.

Example Flow Diagrams

Figure 7:
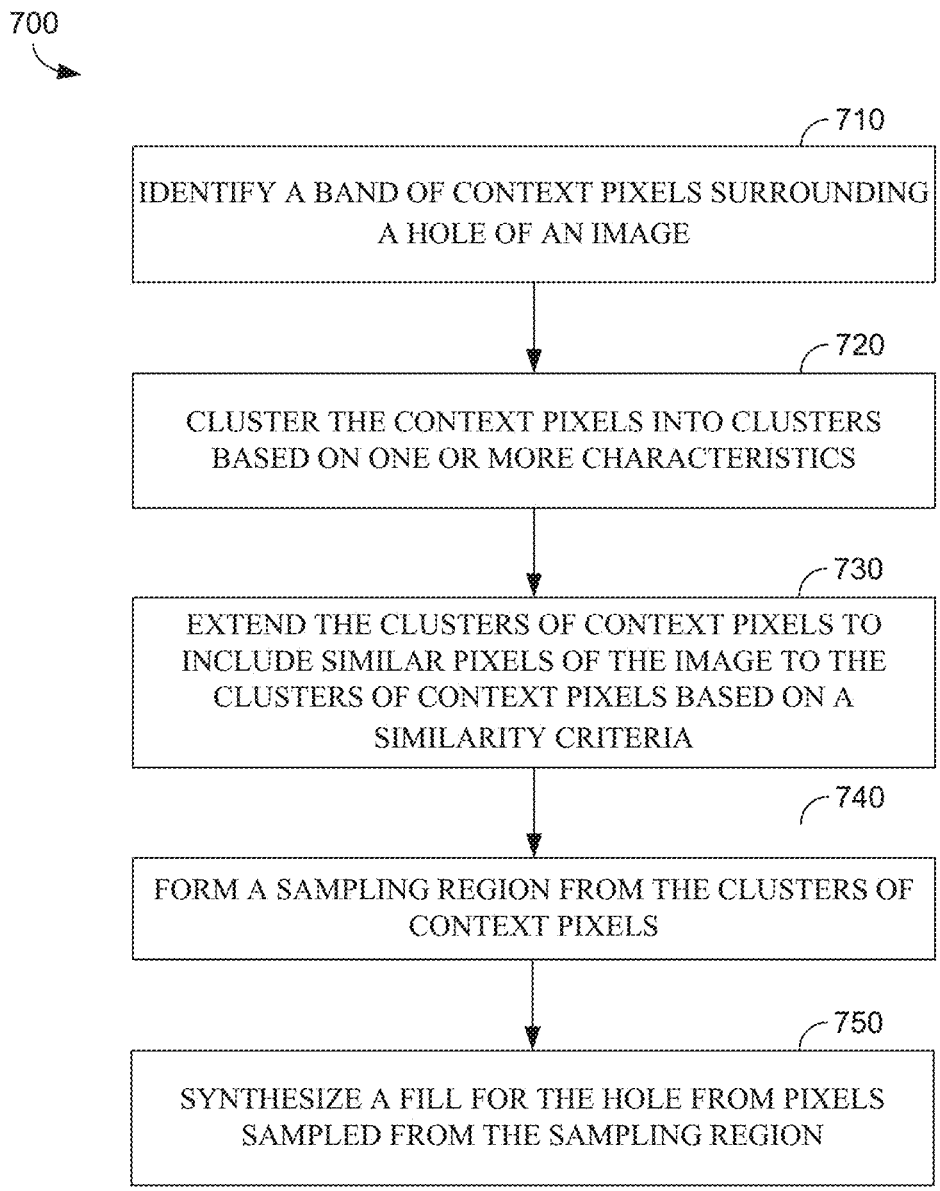
FIG. 7 is a flow diagram showing a method for forming a sampling region of an image, according to various embodiments of the present invention.
Figure 8:
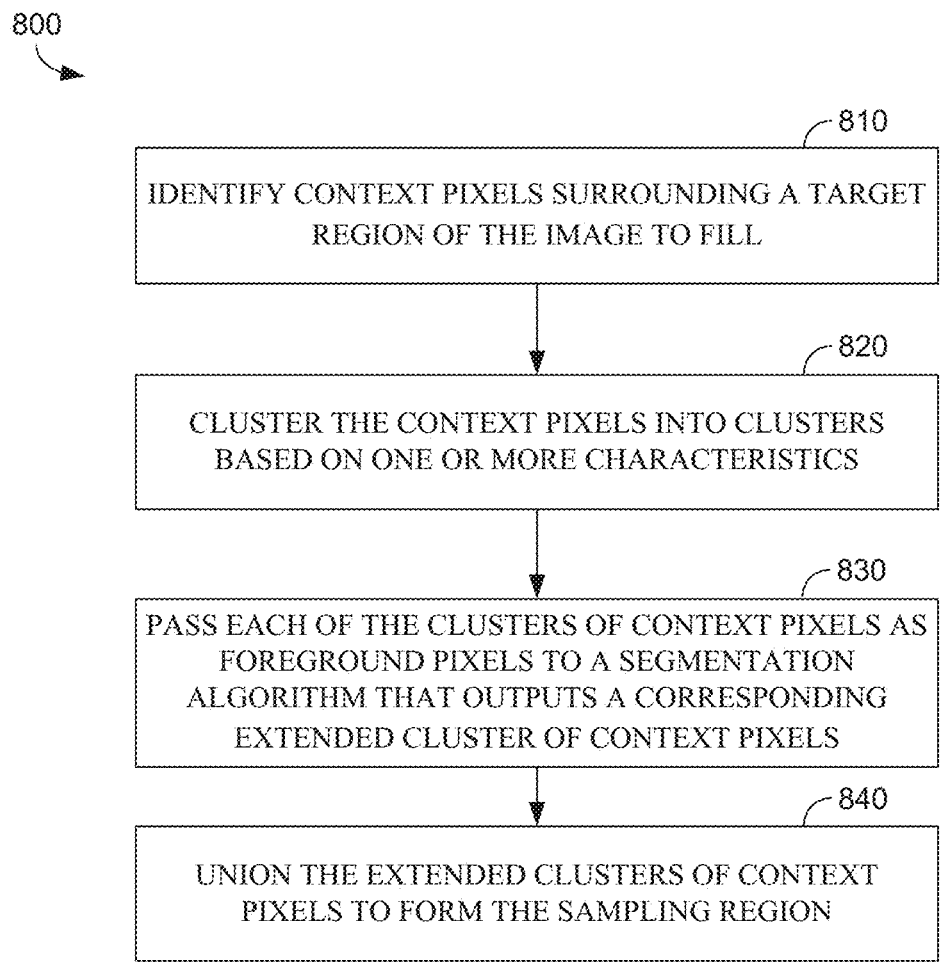
FIG. 8 is a flow diagram showing another method for forming a sampling region of an image, according to various embodiments of the present invention.

With reference now to FIGS. 7-8, flow diagrams are provided illustrating methods for various techniques described herein. Each block of the methods 700 and 800 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 7, FIG. 7 illustrates a method 700 for forming a sampling region of an image, according to various embodiments described herein. Initially at block 710, a band of context pixels is identified surrounding a hole of an image. The hole may be user-selected, and the band may be identified as a width of pixels surrounding the hole. At block 720, the context pixels are clustered into clusters based on one or more characteristics (e.g., color, x/y coordinates, depth, focus, frequency, etc.). For example, clustering may be performed in multiple dimensions (e.g., five-dimensional clustering in RBG space and image space). At block 730, the clusters of context pixels are extended to include similar pixels of the image to the clusters of context pixels based on a similarity criteria. For example, the similarity criteria may include a smoothness term that impacts weights for identifying neighboring pixels with a foreground segmentation algorithm. More specifically, foreground segmentation may be applied to identify foreground and background pixels of the source image, using the context pixels as example foreground pixels. At block 740, a sampling region is formed from the clusters of context pixels. More specifically, the clusters of context pixels may be unioned together to form the sampling region, and the sampling region may be processed to remove small holes and specks. At block 750, a fill for the hole is synthesized from pixels sampled from the sampling region.

Turning now to FIG. 8, FIG. 8 illustrates a method 800 for forming a sampling region of an image, according to various embodiments described herein. Initially at block 810, context pixels are identified surrounding a target region of the image to fill. The target region may be user-selected, and the context pixels may be identified as a width of pixels surrounding the hole. At block 820, the context pixels are clustered into clusters based on one or more characteristics (e.g., color, x/y coordinates, depth, focus, frequency, etc.). At block 830, each of the clusters of context pixels is passed as foreground pixels to a segmentation algorithm that outputs a corresponding extended cluster of context pixels. At block 840, the extended clusters of context pixels are unioned to form the sampling region.

Example Content-Aware Fill Environment

Figure 9:
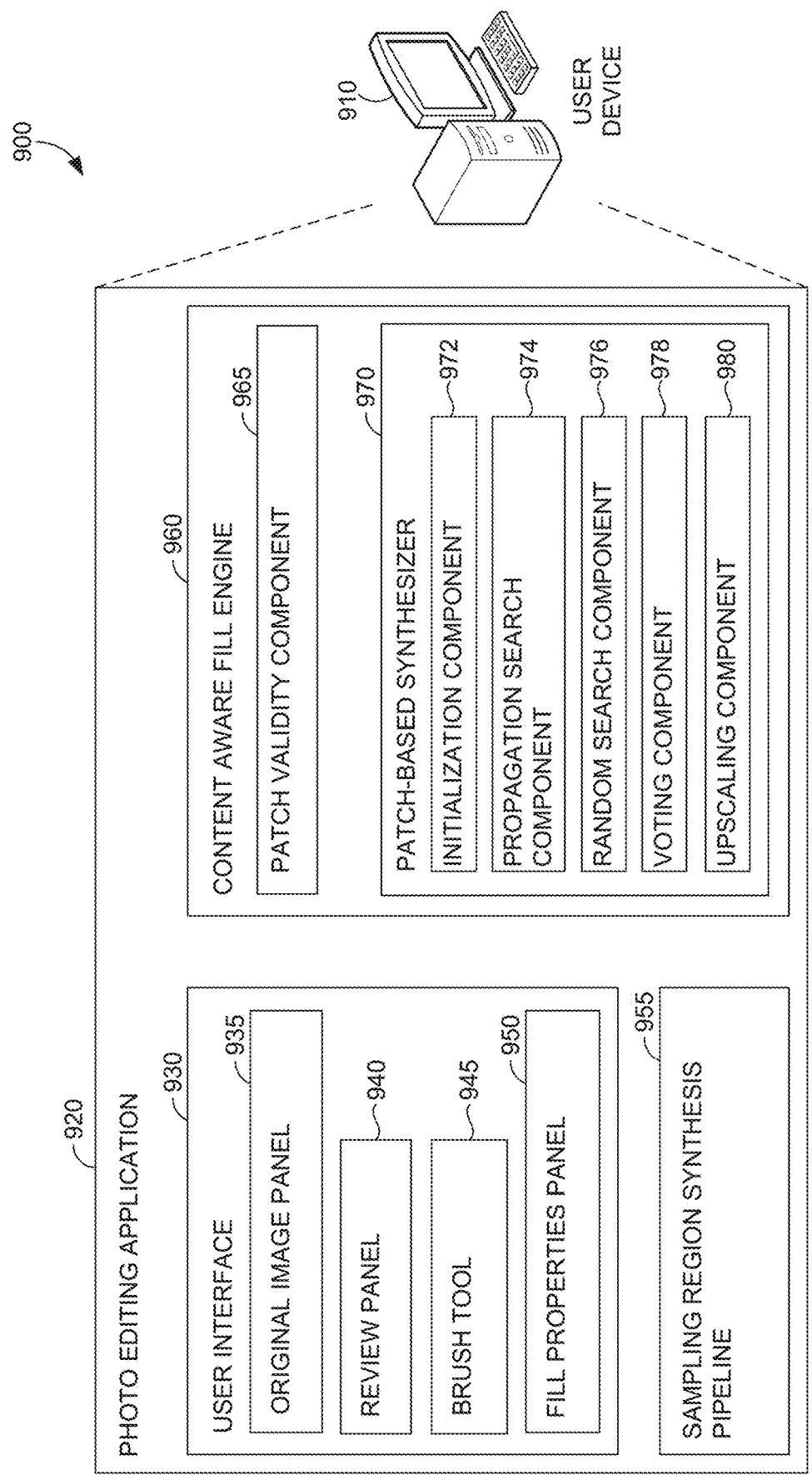
FIG. 9 is a block diagram of an example computing system for automatically synthesizing a content-aware fill, in accordance with embodiments of the present invention.

Referring now to FIG. 9, a block diagram of environment 900 in which one or more embodiments of the present disclosure can be practiced. Generally, environment 900 is suitable for image editing, and, among other things, facilitates automatically synthesizing a content-aware fill. Environment 900 includes user device 910 having photo editing application 920 with user interface 930 and content-aware fill engine 960. User device 910 can be any kind of computing device capable of facilitating image editing. For example, in an embodiment, user device 910 can be a computing device such as computing device 1100, as described below with reference to FIG. 11. In embodiments, user device 910 can be a personal computer (PC), a laptop computer, a workstation, a mobile computing device, a PDA, a cell phone, or the like. User interface 930 is in communication with content-aware fill engine 960. Generally, user interface 930 allows a user to customize any number of input parameters to facilitate content-aware fill engine 960 automatically synthesizing a content-aware fill.

In the embodiment illustrated by FIG. 9, user device 910 includes user interface 930 and content-aware fill engine 960. User interface 930 and/or content-aware fill engine 960 may be incorporated, or integrated, into an application or an add-on or plug-in to an application, such as photo editing application 920. Photo editing application 920 may generally be any application capable of facilitating photo or image editing. Application 920 may be a stand-alone application, a mobile application, a web application, or the like. In some implementations, the application(s) comprises a web application, which can run in a web browser, and could be hosted at least partially server-side. In addition, or instead, the application(s) can comprise a dedicated application. In some cases, the application can be integrated into the operating system (e.g., as a service). One exemplary application that may be used for photo editing is ADOBE® PHOTOSHOP®, which is a graphics editing application. Although generally discussed herein as user interface 930 and/or content-aware fill engine 960 being associated with an application, in some cases, user interface 930 and/or and content-aware fill engine 260, or some portion thereof, can be additionally or alternatively integrated into the operating system (e.g., as a service) or a server (e.g., a remote server).

Generally, user interface 930 is an interactive software interface that allows a user to customize various input parameters for an automatic synthesis of a content-aware fill. In FIG. 9, user interface 930 includes original image panel 935, results panel 940, brush tool 945 and fill properties panel 950. Generally, original image panel 935 presents an original image, and accepts a user selection of a first region of the original image to be filled and/or a user selection of a second region of the original image to be used as a sampling region. Brush tool 945 is an input tool that allows a user to interactively brush the sampling region indicated in original image panel 935 to customize the sampling region. Fill properties panel 950 presents and accepts a selection of various fill properties, such as overlay settings for the sampling region, fill settings such as similarity transform parameters for candidate patches, and output settings for the synthesized fill. Results panel 940 presents a preview of what the fill will look like prior to completion of the fill.

Figure 10:
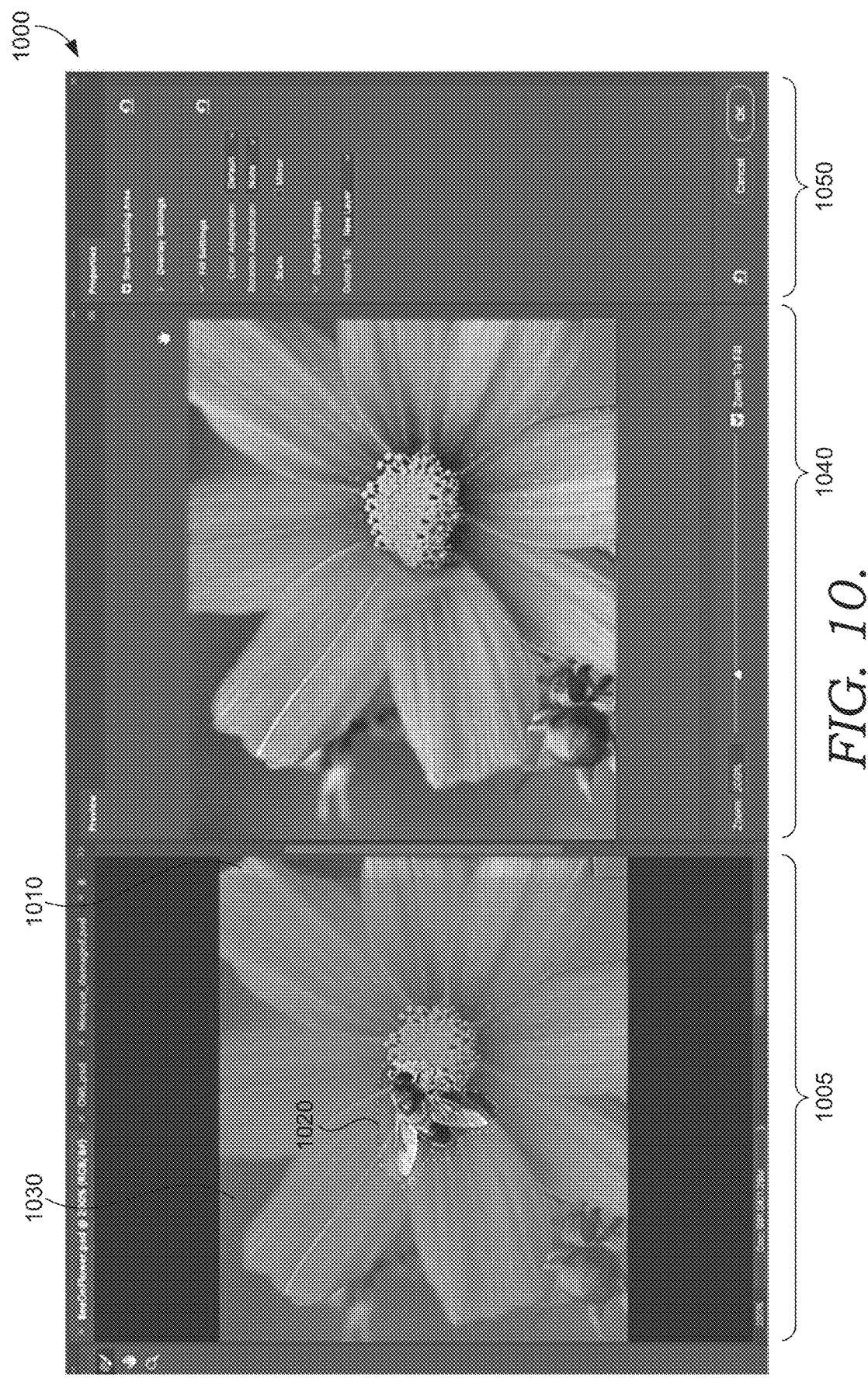
FIG. 10 illustrates an example content-aware fill workspace, in accordance with embodiments of the present invention.

Generally, user interface 930 can allow a user to specify an original image for editing. In some embodiments, user interface 930 provides an option (e.g., a menu command) to trigger a content-aware fill workspace such as content-aware fill workspace 1000 depicted in FIG. 10. FIG. 10 illustrates an example layout of a user interface 930. In this embodiment, content-aware fill workspace 1000 includes original image panel 1005 (which can correspond to original image panel 935 of FIG. 9), results panel 1040 (which can correspond to results panel 940 of FIG. 9), and fill properties panel 1050 (which can correspond to fill properties panel 950 of FIG. 9).

Original image panel 1005 includes original image 1010. A region of the image to be filled may be user-specified, automatically generated, some combination thereof, or otherwise. For example, content-aware fill workspace 1000 can provide a selection tool with which a user can specify a hole boundary such as hole boundary 1020. Original image panel 1005 can overlay hole boundary 1020 on top of original image 1010 to provide an indication of the region of original image 1010 to be filled. Hole boundary 1020 and/or the region within hole boundary 1020 (i.e., the hole) can be stored in one or more data structures indicating the region to be filled. Additionally and/or alternatively, the boundary and/or hole can be stored in one or more data structures indicating a valid sampling region, such as a constraint mask. More specifically, the constraint mask can designate the hole as an invalid region for sampling. The sampling region from which pixels can be sampled for the content-aware fill may be user-specified, automatically synthesized, some combination thereof, or otherwise. The sampling region may be initialized to a default region (e.g., an automatically synthesized content-aware sampling region, a region excluding the hole, etc.) that may be customized, for example, by a user input modifying the default region. The sampling region can be stored in one or more data structures indicating a valid sampling region, such as the constraint mask. More specifically, the constraint mask can designate the sampling region as a valid region for sampling.

In some embodiments, original image panel 1005 can include an overlay to indicate the sampling region. For example, original image panel 1005 includes constraint mask overlay 1030. Overlay settings may be defined and/or customizable, for example, via fill properties panel 1050. For example, customizable overlay settings can include a toggled display, color and/or opacity of constraint mask overlay 1030. Additionally and/or alternatively, an option may be provided for constraint mask overlay 1030 to depict the sampling region or to depict the excluded region of original image 1010 which will not be used for sampling. In the example illustrated in FIG. 10, constraint mask overlay 1030 is toggled on, transparent, red, and depicts the sampling region.

Fill properties panel 1050 (which can correspond to fill properties panel 950 of FIG. 9) can present and accept a selection of various fill properties, such as overlay settings for the sampling region, fill settings such as similarity transform parameters for candidate patches, and output settings for the synthesized fill. Generally, the fill properties can be set to control the manner in which the fill is synthesized. For example, customizable fill settings can include similarity transform parameters (e.g., parameters specifying or otherwise indicating valid ranges for rotations, scaling factor, mirroring and/or translations of candidate patches), color adaption (e.g., gain and/or bias), deterministic fill synthesis, and the like. Customizable fill settings are discussed in greater detail below. Customizable output settings can include a designated output layer for the synthesized fill. For example, outputting to the current layer replaces the hole pixels in the current layer with the synthesized fill, outputting to a new layer outputs the synthesized fill to a separate layer (e.g., with transparency around it), and/or outputting to a duplicate layer copies the original image into a duplicate layer and replaces the hole pixels with the synthesized fill in the duplicate layer. Other variations for fill properties will be apparent to those of ordinary skill in the art.

Generally, content-aware fill workspace 1000 can automatically pass the constraint mask and/or designated fill properties to a back end component such as content-aware fill engine 960 at any time to synthesize (or begin synthesizing) a content-aware fill using the constraint mask. For example, content-aware fill workspace 1000 can automatically pass the constraint mask and/or designated fill properties to content-aware fill engine 960 upon content-aware fill workspace 1000 being triggered, upon a selection of original image 1010, upon a selection or modification to the hole boundary and/or the sampling region (e.g., via brush tool 945, a lasso tool, a polygonal lasso tool, an expand selection tool, a shrink selection tool, etc.), upon a selection or modification of a fill property, upon an authorization to proceed (e.g., an OK button click), and/or some other criteria. In the event a constraint mask is passed before a user selection of a hole boundary and/or sampling region, the constraint mask can be initialized to some default state (which may include, for example, an automatically detected region, a region or selection carried over from some other fill or prior iteration, a default region, etc.).

Content-aware fill workspace 1000 includes results panel 1040, which can include a preview of the synthesized fill prior to completion. A preview matching the final result can be generated by content-aware fill engine 960 operating on the full resolution original image 1010. As described in greater detail below, content-aware fill engine 960 implements an iterative process to construct and refine a fill. Each successive iteration produces a solution with improved detail and generally consistent image structure (e.g., lines and curves in the image). A preview can be derived from this same process used to arrive at the full solution. By starting with the full resolution original image 1010 (as opposed to conventional techniques which operate on a thumbnail to generate a preview) and using a fill solution after an iteration as a preview, an accurate preview can be generated matching the image structure of the end result, unlike conventional previews. Accordingly, content-aware fill engine 960 can pass the fill solution after an iteration (e.g., after each iteration) to results panel 1040 for presentation to the user. In some embodiments, content-aware fill engine 960 can perform successive iterations and provide the solution to results panel 1040 after each iteration. As such, results panel 1040 can include a live preview with gradually updating results. These gradual updates can provide a user with quick, real-time feedback and an earlier opportunity to make any desired changes to arrive at a desired fill.

In some embodiments, content-aware fill engine 960 can provide a preview and break the process before subsequent iterations to facilitate a user input prior to completing the fill. For example, before generating a preview, content-aware fill workspace 1000 can permit a user to select a desired preview resolution and/or dimension (or a default preview resolution can be utilized). Content-aware fill engine 1060 can begin synthesizing a fill and break after an iteration in which the resolution of the corresponding current fill solution matches the designated preview resolution within a predetermined threshold (whether specified in pixels, as a percentage, or otherwise). In these embodiments, content-aware fill engine 960 can pass the current fill to results panel 1040 for presentation as a preview. In this scenario, content-aware fill workspace 1000 can prompt a user for an indication to continue processing, to change parameters and/or to zoom into or out of the preview.

A user indication to continue processing can trigger content-aware fill engine 960 to compute the remaining resolutions, up to the full-resolution result. However, a change in the hole or sampling region, or a change in similarity transform parameters for candidate patches, can render the current fill obsolete. Some existing computations can be salvaged to improve speed and avoid unnecessary recomputations. For example, if one or more masks are not impacted by a change, the masks need not be recomputed. Likewise, image pyramids corresponding to the unchanged masks need not be regenerated. If the user does not change the hole, there is no need to recompute a buffer storing a distance transform from each pixel to the hole boundary. Various calculations such as these and others can be cached and reutilized to improve processing speed, as will be understood by those of ordinary skill in the art.

Another possibility at a break is a user request to zoom in or out of a preview. Since content-aware fill engine 960 already computed lower resolution solutions to arrive at the preview, those solutions can be cached, and accessed and presented in the event a user zooms out of the preview (e.g., requests a lower resolution preview). If a user zooms into the preview (e.g., requests a higher resolution preview), content-aware fill workspace 1000 can pass an indication to content-aware fill engine 960 to resume the computation from the previous resolution where it was last paused, in order to produce the next preview resolution. This approach leverages prior iterations and permits content-aware fill engine 960 to quickly generate the new preview for the front end.

In some embodiments, an incorrect fill can be improved by dividing a hole into two or more sub-divisions and incrementally synthesizing a fill for each sub-division. For example, content-aware fill workspace 1000 can accept an input manually identifying a first sub-division, and a fill can be generated as described above. Content-aware fill workspace 1000 can accept an input (e.g., a button press) indicating the fill should be accepted, upon which content-aware fill workspace 1000 can facilitate a subsequent input manually identifying a subsequent sub-division, and the process repeated. Additionally and/or alternatively to accepting inputs manually identifying sub-divisions, the sub-divisions can be automatically generated, as will be understood by those of ordinary skill in the art. In some embodiments, content-aware fill workspace 1000 can accept an input indicating that the most recently generated fill should be used to generate a fill for a subsequent sub-division. In this manner, content-aware fill workspace 1000 can fill a hole by incrementally generating fills for two or more sub-divisions of the hole.

The foregoing discussion utilized FIG. 10 to illustrate example content-aware fill workspace 1000 with original image panel 1005, results panel 1040, and fill properties panel 1050. In FIG. 10, original image 1010 is an image of a flower with a bee collecting pollen. Results panel 1040 depicts an example fill generated utilizing translations for candidate patches. For images with non-linear features, the quality of the fill can be improved by expanding the search domain to include similarity transformations for candidate patches. For example, fill settings such as similarity transform parameters may enable rotations, scaling, and/or mirroring. The fill settings may be preset, customizable for interactive access, or otherwise.

There are a number of the potential benefits resulting from interactive access to customizable fill settings and/or a customizable sampling region. As a general matter, synthesizing fills using similarity transforms for candidate patches, as opposed to simply using translations, can significantly improve fill quality. However, each image is different, so different types of transforms may be more appropriate for particular images. For example, rotations may be appropriate for curved objects or perspective images. Moreover, rotations with limited ranges may be appropriate in certain circumstances. Generally, rotation adaptation can be used to specify the degree (or range) to which patches can rotate when filling the hole as part of a patch synthesis. For example, preset fill settings may be designated (e.g., low, medium, high, full) corresponding to a range of potential rotations. Full rotations (e.g., −180° to 180°) may be appropriate for round or circular objects. Some intermediate degree of rotation may be appropriate for images with significant amounts of curvature. Some lower degree of rotation may be appropriate for images with curved lines like a bend in a road. In another example, scaling may be appropriate to improve a synthesized fill for image content with repeating patterns of different sizes, or under perspective. Mirroring (e.g., a flip such as a horizontal flip) can improve a synthesized fill for images with symmetry. Color adaptation can be used to specify gain and/or bias strength to improve a synthesized fill for images by changing brightness and/or contrast of patches used to fill the hole as part of a patch synthesis. By allowing a user to select an appropriate fill setting, a user can guide the patch synthesis to an optimal solution.

In addition and/or in the alternative to providing customizable similarity transform parameters, another customizable fill setting is a deterministic fill synthesis mode. Conventional patch synthesis techniques are generally multi-threaded. More specifically, a designated hole can be split it into several files for parallel processing by different threads. The timing with which the threads finalize their respective solutions can change the resulting fill solution for the designated hole. Since this timing is not known or controlled in conventional techniques, conventional patch synthesis generally is not repeatable. In a deterministic fill synthesis mode, a repeatable patch synthesis technique can be implemented, as explained in more detail below. However, since this deterministic process may increase processing time, allowing the user to control this mode permits the user perform a tradeoff between speed and repeatability.

In addition and/or in the alternative to providing customizable fill settings, a customizable sampling region can be used to improve an automatically synthesized fill. Generally, a content-aware fill workspace can facilitate a user customizing the sampling region. For example, the content-aware fill workspace may provide an input tool such as a brush tool (e.g., brush tool 945) that allows a user to interactively brush the sampling region in original image panel 935 to customize the sampling region. The brush tool can facilitate a user input adding to or subtracting from a valid sampling region, which may be stored in a constraint mask. The brush tool may be resizable to increase or decrease the brush size. Additionally and/or alternatively, the shape of the capture region of the brush tool may be customizable to any shape. As such, the brush tool can be used to add or remove from the sampling region. Additionally and/or alternatively, various other input tools can be provided to facilitate a user selection and/or modification of a hole and/or a sampling region, such as a lasso tool, a polygonal lasso tool, an expand selection tool, a shrink selection tool, and the like. In some embodiments, upon detecting completion of a user input (such as a brush stroke removing pixels from the sampling region and/or corresponding overlay), the content-aware fill workspace can automatically pass the resulting sampling region (e.g., via a constraint mask) to a back end component such as content-aware fill engine 960 to synthesize a content-aware fill using the specified constraint mask.

Returning now to FIG. 9, content-aware fill engine 960 includes patch validity component 965 and patch-based synthesizer 970. Patch validity component 965 and patch-based synthesizer 970 operate in communication to automatically synthesize a content-aware fill (e.g., to fill a hole indicated by a constraint mask passed from user interface 930). Patch-based synthesizer 270 may perform a patch synthesis using a randomized algorithm to generate and evaluate candidate patches and identify approximate nearest neighbor matches between image patches. This can involve an iterative process of initialization, searching, voting and upscaling for each scale of a multi-scale solution, as will be understood by those of ordinary skill in the art. Candidate patches may be generated from a source image (e.g., the sampling region designated by a constraint mask) during initialization, search, and upsampling. Generally, patch validity component 965 evaluates the validity of candidate patches by applying one or more improved patch validity tests. Advantageously, each time patch-based synthesizer 970 identifies a candidate patch, patch validity component 965 determines the validity of the patch.

Generally, one or more of the patch validity tests can be incorporated into an interactive system for automatically synthesizing a content-aware fill. For example, in the embodiment illustrated in FIG. 9, patch validity component 965 can evaluate the validity of candidate patches for patch-based synthesizer 970 by applying one or more patch validity tests. Any suitable patch validity test may be applied, some examples of which are described in U.S. application Ser. No. 15/921,457, the contents of which are herein incorporated by reference in their entirety.

In the example implementation depicted in FIG. 9, patch-based synthesizer 970 performs a patch synthesis using a randomized algorithm to generate and evaluate candidate patches and identify approximate nearest neighbor matches between image patches. To construct a given a target image (e.g., a hole) using image patches transformed from a source image, a data structure called a nearest neighbor field (NNF) can be used to manage mappings between patches in the source and target images. The NNF includes a transform for each pixel in the target image. As described herein, these transforms may include similarity transforms. For a given pixel, the transform in the NNF for that pixel identifies a corresponding source patch which can be tested for similarity to a target patch associated with the pixel. The goal of patch-based synthesizer 970 is to identify a source patch (e.g., from a valid sampling region) that best matches each target patch (i.e., the nearest neighbor). The NNF field can be updated during various stages of the synthesis process to keep track of the nearest neighbor source patch for each target patch.

Patch-based synthesizer 970 can involve an iterative process of initialization, searching, voting and upscaling for each scale of a multi-scale solution, as will be understood by those of ordinary skill in the art. As such, in the embodiment illustrated by FIG. 9, patch-based synthesizer 970 includes corresponding initialization component 972, propagation search component 974, random search component 976, voting component 978 and upscaling component 980.

For each target pixel from a target image (e.g., a hole), initialization component 972 assigns a randomly generated transform as an initialization. As described herein, these transforms may include similarity transforms. Similarity transform parameters may be user-selected, pre-determined, some combination thereof, or otherwise. Generally, the randomly generated transforms are bounded over the applicable similarity transform parameters (e.g., translation, scale, rotation and/or mirror search domains). Advantageously, patch validity component 965 determines the validity of each candidate patch. For candidate source patches that fail the patch validity test, initialization component 972 assigns a new randomly generated transform to replace the failed candidate patch, and the patch validity test is repeated. If a patch validity test fails some predetermined amount of times (e.g., 256), a candidate patch may be generated by reducing the valid sampling region (e.g., dilating the hole), bounding the corresponding search domain and/or by using a randomly generated simple translation, rather than a full similarity transform. As such, this alternative technique can be utilized to generate a valid candidate patch.

Generally, patch-based synthesizer 970 performs searching (e.g., via propagation search component 974 and random search component 976) to identify candidate patches that improve the NNF, as will be understood by those of ordinary skill in the art. Advantageously, patch validity component 965 determines the validity of each candidate patch. If a candidate source patch fails a patch validity test, the candidate patch is not utilized to improve the NNF. Candidate patches that pass patch validity are evaluated to determine whether a given candidate patch is a closer match for a particular target patch than an existing nearest neighbor in the NNF (e.g., whether a candidate patch reduces patch distance). In other words, NNF=Min(NNF, Previous NNF).

In some embodiments, propagation search component 974 and random search component 976 can identify candidate patches in a manner that facilitates a deterministic fill synthesis. In conventional techniques, a designated hole can be split up into several sub-divisions for parallel processing by different threads. In one example, a hole might be split up into three sub-divisions, and each of three threads processes a corresponding sub-division in parallel. In conventional techniques, a particular thread processes each pixel in an allocated sub-division in scanline order. For example, for a given pixel, propagation search component 974 propagates solutions for neighboring pixels and selects the best solution, random search component 976 identifies solutions for randomly identified pixels and selects the best solution, and the assigned thread moves onto the next pixel in scanline order. However, because some threads may finish generating a fill for an assigned sub-division faster than other threads, often times fills are generated for a sub-division using patches sampled from an incomplete fill for a neighboring sub-division. As a result, conventional patch synthesis generally is not repeatable.

As such, in some embodiments, a designated hole can be split up into more sub-divisions than threads, and multiple threads can be allocated to only process non-bordering sub-divisions in parallel. In a simple example, assume a hole is split into six blocks, 0-5. For even iterations of patch-based synthesizer 970, three threads can process alternating blocks (e.g., 0, 2, 4) in scanline order. During odd iterations, the threads can process alternating blocks in reverse scanline order (e.g., 1, 3, 5). Because neighboring sub-divisions have completed fills by the time any thread finishes processing a particular sub-division, the timing by which each thread finishes processing its allocated sub-division does not matter. As such, allocating multiple threads to process non-bordering sub-divisions in parallel can produce deterministic results.

In some embodiments, a wavefront technique can be applied to identify candidate patches to facilitate a deterministic fill synthesis. Generally, wavefront processing is a technique for processing a multidimensional grid for which a particular unit in the grid depends upon other units in the grid. By starting in a corner, processing proceeds in a diagonal sweep across the grid which resembles a wavefront. In the context of a patch-based synthesis, searching can be implemented utilizing a wavefront instead of in scanline order (e.g., propagation search component 974 can propagate solutions for a neighboring pixel above and for a neighboring pixel to the left). Further, a random number generator utilized by random search component 976 to randomly identified pixels can be modified. Random number generators are usually designed to generate a known sequence of uniform numbers when given a seed. For wavefront processing to produce a deterministic patch synthesis, the random number generator can be modified to accept <x, y, patch-based synthesizer iteration, random search iteration> as its input to generate a uniform number. In this manner, for a given <x,y> pixel value, a given sequence of calls to the random number generator will produce the same results. In this manner, a deterministic set of candidate patches can be identified, facilitating a deterministic fill synthesis. Other variations will be understood by those of ordinary skill in the art.

Generally, patch-based synthesizer 970 performs voting (e.g., via voting component 978) to generate a proposed target image. Generally, patch-voting is performed to accumulate the pixel colors of each overlapping neighbor patch, and the color votes are weighted averaged. The proposed target image can be passed to the front end (e.g., results panel 940) for presentation as a preview. As described above, during each subsequent iteration, the proposed target image is updated, and the updated target image can be passed to the front end for each iteration. The result is a gradually updating, live preview. These gradual updates can provide a user with quick, real-time feedback and an earlier opportunity to make any desired changes to arrive at a desired fill.

Patch-based synthesizer 970 performs upscaling (e.g., via upscaling component 980) to upscale the current NNF for use as a baseline during a subsequent iteration at the next scale. As this upscaling can produce invalid patches, patch validity component 965 advantageously determines the validity of candidate patches corresponding to the upscaled NNF. Candidate patches that pass patch validity are evaluated during a subsequent patch-based synthesizer 270 iteration to determine whether a given candidate patch is a closer match for a particular target patch than a corresponding candidate patch generated from a randomly initialized NNF.

Generally, the flow through patch-based synthesizer 970 is repeated for subsequent pyramid scales until a full resolution solution is generated and passed to the front end for presentation to a user. In some embodiments, patch-based synthesizer 970 can break upon some component detecting an updated (e.g., by the user) sampling region and/or an applicable translation, scale, rotation and/or mirror search domain. In this scenario, patch-based synthesizer 970 can salvage existing computations to improve speed and avoid unnecessary recomputations, as described in more detail above, and may automatically begin processing the updated sampling region and/or search domain. Additionally and/or alternatively, patch-based synthesizer 970 can pass a proposed target image for presentation as a preview and break its process to facilitate a user input prior to completing the fill, as described in more detail above. A user indication to continue processing can trigger patch-based synthesizer 970 to compute the remaining resolutions, as described in more detail above.

As such, using implementations described herein, a user can efficiently and effectively synthesize content-aware fills. Although techniques are described herein with respect to image completion in the context of photo editing, the present techniques may be applied to any hole-filling algorithm or any other algorithm that samples some region of an image to fill another region (e.g., spot healing). These implementations are merely exemplary, and other implementations will be understood by those of ordinary skill in the art.

Exemplary Operating Environment

Figure 11:
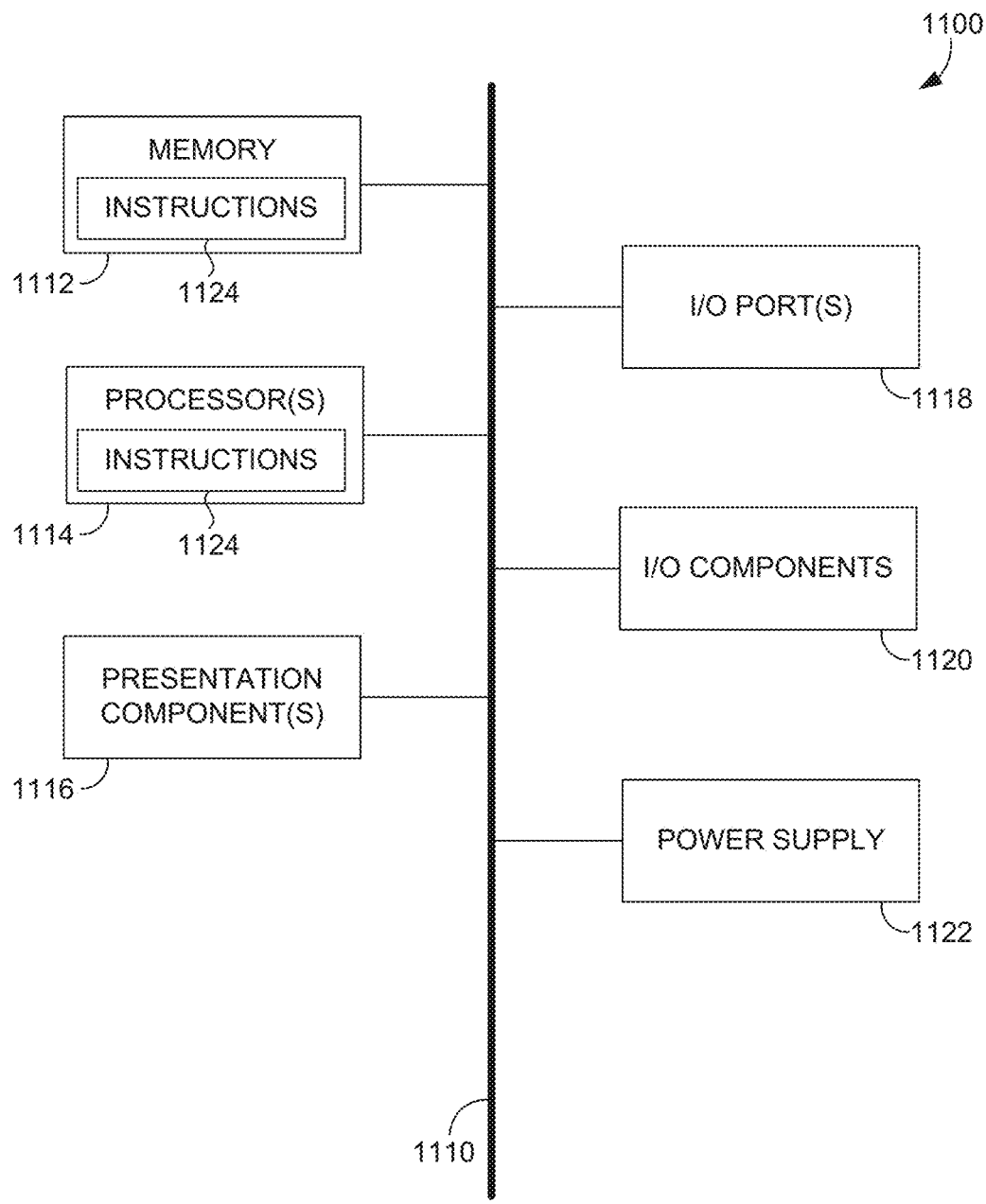
FIG. 11 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1100. Computing device 1100 may be equipped with depth cameras, such as stereoscopic camera systems, infrared camera systems, RGB camera systems, touchscreen technology, and combinations of these, for gesture detection and recognition. Additionally, the computing device 1100 may be equipped with accelerometers or gyroscopes that enable detection of motion. The output of the accelerometers or gyroscopes may be provided to the display of computing device 1100 to render immersive augmented reality or virtual reality.

Embodiments described herein support automatically synthesizing a content-aware sampling region. The components described herein refer to integrated components of an automatic synthesis system. The integrated components refer to the hardware architecture and software framework that support functionality using the automatic synthesis system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for the system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform operations comprising:
   identifying a band of context pixels surrounding a target region of an image;
   clustering the context pixels of the band into clusters based on one or more characteristics of the context pixels;
   enlarging the clusters of context pixels of the band to include pixels of the image that are similar to the clusters of context pixels based on a similarity criteria;
   forming a sampling region from the enlarged clusters of context pixels; and
   synthesizing a fill for the target region from pixels sampled from the sampling region.

2. The one or more computer storage media of claim 1, the operations further comprising applying blurring to the band of context pixels prior to the clustering.

3. The one or more computer storage media of claim 1, wherein enlarging the clusters based on the similarity criteria comprises passing each of the clusters of context pixels as foreground pixels to a foreground segmentation algorithm that outputs a corresponding enlarged cluster of context pixels.

4. The one or more computer storage media of claim 1, wherein clustering the context pixels based on the one or more characteristics comprises multi-dimensional clustering based on color and position in the image.

5. The one or more computer storage media of claim 1, the operations further comprising pruning at least one of the clusters that does not border the target region.

6. The one or more computer storage media of claim 1, the operations further comprising adjusting an area of at least one of the enlarged clusters of context pixels for proportionality.

7. The one or more computer storage media of claim 6, wherein adjusting the area of at least one of the enlarged clusters of context pixels comprises rerunning a foreground segmentation algorithm targeting an expansion ratio for the enlarged clusters of context pixels.

8. The one or more computer storage media of claim 1, the operations further comprising at least one of filling in holes or removing specks of the sampling region.

9. The one or more computer storage media of claim 1, the operations further comprising adding a padding band of pixels surrounding the target region to the sampling region.

10. A computerized method for forming a sampling region of an image, the method comprising:
 identifying context pixels surrounding a target region of the image to fill;
 clustering the context pixels into clusters based on one or more characteristics of the context pixels;
 providing each cluster of one or more of the clusters of context pixels as a seed of example foreground pixels to a foreground segmentation algorithm that outputs a corresponding extended cluster of context pixels; and
 unioning the extended clusters of context pixels to form the sampling region.

11. The computerized method of claim 10, further comprising applying blurring to the context pixels prior to the clustering.

12. The computerized method of claim 10, wherein clustering the context pixels based on the one or more characteristics comprises multi-dimensional clustering based on color and position in the image.

13. The computerized method of claim 10, further comprising pruning at least one of the clusters that does not border the target region.

14. The computerized method of claim 10, further comprising adjusting an area of at least one of the extended clusters of context pixels for proportionality.

15. The computerized method of claim 14, wherein adjusting the area of at least one of the extended clusters of context pixels comprises rerunning the foreground segmentation algorithm targeting an expansion ratio for the extended clusters of context pixels.

16. The computerized method of claim 10, further comprising at least one of filling in holes or removing specks of the sampling region.

17. The computerized method of claim 10, further comprising adding a padding band of pixels surrounding the targeting region to the sampling region.

18. A computer system comprising:
 one or more hardware processors and memory configured to provide computer program instructions to the one or more hardware processors;
 a means for synthesizing an expansion region to enlarge a designated region of an image using the one or more hardware processors to control a foreground segmentation algorithm to segment foreground pixels of the image, from outside the designated region, using the designated region as example foreground pixels, the expansion region comprising the foreground pixels from outside the designated region; and
 an interface component configured to use the one or more hardware processors to present the designated region in association with the synthesized expansion region.

19. The computer system of claim 18, wherein the designated region is a user-selected region outlining an object, and wherein the synthesized expansion region captures a portion of the object that was inadvertently omitted from the user-selected region.

20. The computer system of claim 18, wherein the designated region is an automatically detected region identified using object detection, and wherein the synthesized expansion region captures a portion of an object that was omitted from the automatically detected region.

* * * * *